(12) United States Patent
Ogihara et al.

(10) Patent No.: US 10,468,639 B2
(45) Date of Patent: Nov. 5, 2019

(54) LITHIUM BATTERY PACKAGING MATERIAL

(71) Applicant: TOPPAN PRINTING CO., LTD., Tokyo (JP)

(72) Inventors: Yu Ogihara, Tokyo (JP); Masayoshi Suzuta, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 89 days.

(21) Appl. No.: 15/277,585

(22) Filed: Sep. 27, 2016

(65) Prior Publication Data
US 2017/0018744 A1    Jan. 19, 2017

Related U.S. Application Data

(63) Continuation of application No. PCT/JP2015/060596, filed on Apr. 3, 2015.

(30) Foreign Application Priority Data

Apr. 3, 2014 (JP) .................................. 2014-076911

(51) Int. Cl.
*H01M 2/02* (2006.01)
*B32B 15/20* (2006.01)
(Continued)

(52) U.S. Cl.
CPC ............. *H01M 2/0287* (2013.01); *B32B 7/12* (2013.01); *B32B 15/08* (2013.01); *B32B 15/20* (2013.01);
(Continued)

(58) Field of Classification Search
CPC ............. H01M 2/0287; H01M 2/0275; H01M 2/0277; B23B 7/12; B23B 15/08; B23B 27/32
See application file for complete search history.

(56) References Cited

U.S. PATENT DOCUMENTS 3,370,106 A    2/1968  Hall, Jr. et al.
8,536,268 B2 *  9/2013  Karjala .................. C08F 10/00
                                                           524/570
(Continued)

FOREIGN PATENT DOCUMENTS

CN    103155207 A    6/2013
EP    1 981 099 A2   10/2008
(Continued)

OTHER PUBLICATIONS

International Search Report issued in International Patent Application No. PCT/JP2015/060596 dated May 19, 2015.
(Continued)

*Primary Examiner* — Ula C Ruddock
*Assistant Examiner* — Thomas H. Parsons
(74) *Attorney, Agent, or Firm* — Foley & Lardner LLP

(57) ABSTRACT

A lithium battery packaging material is provided with a laminate formed by sequentially laminating an adhesive layer, an aluminum foil layer provided with a corrosion prevention treatment layer on at least one surface thereof, an adhesive resin layer and a sealant layer on one surface of a substrate layer. The adhesive resin layer contains an adhesive resin composition, and a polypropylene or propylene-α-olefin copolymer having an atactic structure.

7 Claims, 7 Drawing Sheets

(51) Int. Cl.
  *B32B 7/12* (2006.01)
  *B32B 15/08* (2006.01)
  *B32B 27/32* (2006.01)
  *H01M 10/0525* (2010.01)
  *H01M 10/052* (2010.01)

(52) U.S. Cl.
  CPC ........... *B32B 27/32* (2013.01); *H01M 2/0202* (2013.01); *H01M 2/024* (2013.01); *H01M 2/026* (2013.01); *H01M 2/0262* (2013.01); *H01M 2/0275* (2013.01); *H01M 2/0277* (2013.01); *H01M 2/0285* (2013.01); *H01M 10/0525* (2013.01); *B32B 2307/31* (2013.01); *B32B 2307/714* (2013.01); *B32B 2457/00* (2013.01); *H01M 10/052* (2013.01); *H01M 2220/10* (2013.01); *H01M 2220/20* (2013.01); *H01M 2220/30* (2013.01)

(56) References Cited

U.S. PATENT DOCUMENTS

| | | |
|---|---|---|
| 2008/0241663 A1 | 10/2008 | Yamashita et al. |
| 2010/0255365 A1 | 10/2010 | Suzuta |
| 2013/0209868 A1 | 8/2013 | Suzuta et al. |

FOREIGN PATENT DOCUMENTS

| | | |
|---|---|---|
| EP | 2 202 823 A1 | 6/2010 |
| JP | S57-049162 A | 3/1982 |
| JP | H06-124694 A | 5/1994 |
| JP | H11-034272 A | 2/1999 |
| JP | 2003-051291 A | 2/2003 |
| JP | 5187370 B2 | 4/2013 |
| JP | 2013-157286 A | 8/2013 |
| JP | 2014-7130 A | 1/2014 |
| JP | 2014007130 * | 1/2014 |
| JP | 2014-049307 A | 3/2014 |
| JP | 2014-238978 A | 12/2014 |
| WO | WO 2016/125684 A1 | 8/2016 |

OTHER PUBLICATIONS

Extended European Search Report dated Aug. 14, 2017 in European Patent Application No. 15773866.7.
Taiwanese Office Action dated Aug. 28, 2018 in corresponding application No. 104110809.
Chinese Office Action from Chinese application No. 2015800164663 dated Apr. 18, 2019.

* cited by examiner

LITHIUM BATTERY PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/060596, filed on Apr. 3, 2015, which is based upon and claims the benefit of priority of Japanese Patent Application No. 2014-076911, filed on Apr. 3, 2014, the entire contents of which are all hereby incorporated by reference.

TECHNICAL FIELD

The present invention relates to a lithium battery packaging material.

BACKGROUND

In recent years, lithium ion secondary batteries (hereinafter, referred to as "lithium batteries") enabling high energy, reduced thickness, and compact size have been actively developed as secondary batteries for general use within portable terminals such as laptop computers and mobile phones, video cameras, and the like. As the packaging material used in a lithium battery, rather than metal cans which have been used as the packaging material for conventional batteries, packaging material which forms a multilayer film (such as a configuration including a heat-resistant substrate layer/an aluminum foil layer/and a thermal adhesive film layer) in the shape of a pouch has been used for the advantages of being lightweight and the degree of freedom when selecting the shape of the cell.

Lithium batteries contain, as battery contents, a positive electrode material, a negative electrode material, and either an electrolytic solution prepared by dissolving a lithium salt as an electrolyte in an aprotic solvent having a penetrative ability such as propylene carbonate, ethylene carbonate, dimethyl carbonate, diethyl carbonate, or ethyl methyl carbonate, or an electrolyte layer formed from a polymer gel impregnated with the electrolytic solution. If the solvent having the penetrative ability penetrates through a thermal adhesive film layer that acts as a sealant, there are the problems that the strength of lamination between the aluminum foil layer and the thermal adhesive film layer can deteriorate, and the electrolytic solution evaporates (dries up) from the gaps between the aluminum foil layer and the thermal adhesive film layer.

Further, as the lithium salt which is the electrolyte of the battery, salts such as $LiPF_6$ or $LiBF_4$ may be used, but these salts generate hydrofluoric acid due to a hydrolysis reaction with moisture. Therefore, these salts can cause corrosion of metal surfaces or the deterioration of the lamination strength between each of the layers of a multilayer film. By the use of aluminum foil, moisture can be substantially blocked from penetrating through the surface of the packaging material. However, in the lithium battery packaging material, the multilayer film has a construction that is bonded by heat sealing, thus, the hydrolysis of the lithium salt due to moisture which penetrates through the edge face of the seal of the thermal adhesive film layer which functions as a seal is still a concern. Accordingly, it is important to strengthen the interlayer adhesive strength between the aluminum foil and the thermal adhesive film layer in order to have content resistance (the electrolytic solution resistance and the hydrofluoric acid resistance).

Lithium batteries are widely used in portable mobile phones, and there are cases when the use environment thereof may reach a temperature of 60 to 70° C., for example, inside a vehicle during summer, thus, it has been necessary that the lithium battery packaging material is imparted with resistance to the electrolytic solution even in high temperature environments.

Recently, the automobile industry has been developing automobiles using only secondary batteries or automobiles combining the use of gasoline and a secondary battery such as electric vehicles (EV) and hybrid electric vehicles (HEV). Further, the power storage industry has been developing electric double layer capacitors (EDLC) for storing electrical power manufactured in solar cells or wind power generators, or lithium ion capacitors (LIC) having properties of both secondary batteries and capacitors. The automobile industry and the power storage industry and the large-scale secondary battery/capacitor market have sought a battery which not only improves the performance of the battery, but has greater safety and long-term stability (10 to 30 years).

Generally, as the functions which are sought in the lithium battery packaging material used in consumer applications, inhibiting the delamination between the aluminum foil layer and the thermal adhesive film layer may be mentioned. The delamination is generated by the effects of the electrolytic solution or hydrofluoric acid generated by hydrolysis of the lithium salt which is an electrolyte.

Generally, the battery body part of the lithium battery packaging material made up of a multilayer film is mounted to the formed/drawn part formed by cold forming, and is finally sealed by heat sealing. The thermal lamination method is excellent in the point of improving the adhesiveness between the aluminum foil layer and the thermal adhesive film layer by thermocompression bonding, but when the heating is insufficient or the cooling rate is slow, crystallization progresses easily. Therefore, microcracks are easily generated in the thermal adhesive film layer due to the strain generated during cold forming, specifically, the blushing phenomenon of the film occurs easily in the drawn portions such as the side surfaces or the corners. The blushing phenomenon in cold forming lowers insulation and promotes the deterioration of the battery performance, thus, the means to not only inhibit the blushing phenomenon due to cracks, but also to inhibit the blushing due to bending has been sought.

For example, PTL 1 discloses a lithium battery packaging material. According to this patent literature, low crystalline ethylene-butene copolymer or propylene-butene copolymer, amorphous ethylene-propylene copolymer, propylene-ethylene copolymer, or the like is added to an adhesive resin to adjust the fluidity (Melt Flow Rate; MFR) of a molten plastic, so that delamination due to an electrolytic solution and hydrofluoric acid does not easily occur.

PTL 2 discloses a packaging material for batteries, which is a laminate made of a substrate layer, an adhesive layer, a chemical conversion treatment layer, aluminum, a chemical conversion treatment layer, an adhesive resin layer, and an innermost resin layer laminated in this order. In the same manner as PTL 1, an elastomer component purposing to relax stress is added to the innermost layer to impart flexibility, thereby improving bending resistance and the inhibition of blushing when formed.

CITATION LIST

Patent Literature

PTL 1: JP-A-2003-051291
PTL 2: JP-B-5187370

SUMMARY OF THE INVENTION

Technical Problem

However, the conventional additives described in, for example, PTLs 1 and 2 for which the components are defined have not been sufficiently investigated with regards to the relationship between the additive components and the properties of the packaging material for the lithium battery. Therefore, if the amount of the additive is increased in the adhesive resin layer, the sealing strength improves, but the electrolytic solution lamination strength deteriorates, thus, there has been difficulty in achieving a plurality of properties such as sealing strength and electrolytic solution lamination strength. As a result, the necessary amount of additive cannot be added to the adhesive resin layer, thus, the fact has been that covering the necessary properties, such as obtaining a satisfactory blushing resistance, is difficult.

The present invention has been made in light of these circumstances and aims to provide a lithium battery packaging material, in which the effect of additives on the various properties are more clear, and the lamination strength, the blushing resistance and the bending resistance are improved.

Solution to Problem

The present inventor, as the result of thorough study for solving the aforementioned problems, has newly discovered that while the deterioration of the electrolytic solution lamination strength is better inhibited, the other necessary properties could be stably obtained, and has completed the present invention by adding an atactic component to the adhesive resin layer. Furthermore, the present inventor has discovered that properties such as the blushing resistance and the bending resistance can be further improved by adding both an atactic component and an isotactic component.

Namely, the present invention has the following configuration.

The lithium battery packaging material according to a first aspect of the present invention is provided with a laminate configured by laminating an adhesive layer, an aluminum foil layer provided with a corrosion prevention treatment layer on at least one surface thereof, an adhesive resin layer, and a sealant layer in this order on one surface of a substrate layer. In the packaging material, the adhesive resin layer contains an adhesive resin composition and a polypropylene or propylene-α-olefin copolymer having an atactic structure.

In the lithium battery packaging material according to the first aspect of the present invention, the adhesive resin layer may further contain a propylene-α-olefin copolymer having an isotactic structure.

In the lithium battery packaging material according to the first aspect of the present invention, a ratio of the adhesive resin composition in the adhesive resin layer may be 40 to 95 wt %; and a ratio of the polypropylene or propylene-α-olefin copolymer having an atactic structure may be 5 to 60 wt %.

In the lithium battery packaging material according to the first aspect of the present invention, a ratio of the adhesive resin composition in the adhesive resin layer may be 40 to 95 wt %; and a ratio of a total (A)+(B) of the polypropylene or propylene-α-olefin copolymer (A) having the atactic structure and the propylene-α-olefin copolymer (B) having the isotactic structure is 5 to 60 wt %.

In the lithium battery packaging material according to the first aspect of the present invention, the corrosion prevention treatment layer may be provided on a surface of the aluminum foil layer, the surface of the aluminum foil layer being in contact with the adhesive resin layer; and the corrosion prevention treatment layer may contain a cationic polymer and a cross-linking agent for cross-linking the cationic polymer.

In the lithium battery packaging material according to the first aspect of the present invention, the cationic polymer may be at least one member selected from the group consisting of a polyethyleneimine, an ionic polymer complex made of a polyethyleneimine and a polymer having carboxylic acid, a primary amine-grafted acrylic resin obtained by grafting a primary amine onto a main acrylic backbone, a polyallylamine and a derivative thereof, and an aminophenol.

In the lithium battery packaging material according to the first aspect of the present invention, the corrosion prevention treatment layer may be a layer containing a rare earth element oxide.

In the lithium battery packaging material according to the first aspect of the present invention, the corrosion prevention treatment layer may include a layer formed by subjecting the aluminum foil layer to one or more of a degreasing treatment, a hydrothermal modification treatment, an anodic oxidation treatment, and a chemical conversion treatment.

Advantageous Effects of the Invention

According to the lithium battery packaging material of the aspect of the present invention, the adhesive resin layer includes an adhesive resin composition and a polypropylene or propylene-α-olefin copolymer having an atactic structure, and thus exhibits good strength of lamination, blushing resistance and bending resistance. Further, when the adhesive resin layer includes the propylene-α-olefin copolymer having an isotactic structure, heat sealing strength and degassing sealing strength can be improved.

DESCRIPTION OF REPRESENTATIVE EMBODIMENTS

Figure 1:
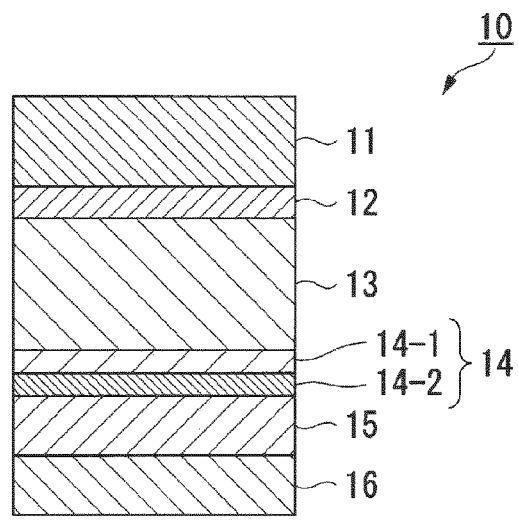
FIG. 1 is a cross-sectional view schematically illustrating a configuration of a lithium battery packaging material according to an embodiment of the present invention.

A lithium battery packaging material according to an embodiment of the present invention will be described below with reference to the drawings. It will be understood that the present invention is not limited to the representative embodiments, below, as the description below is representative of the present invention.

In the drawings referred to in the following description in order to make the constituent members be of an understandable size in the drawing, the dimensions and the proportions of the constituent members are modified as needed.

First, the lithium battery packaging material according to an embodiment of the present invention (packaging material for a lithium ion battery) will be described. FIG. 1 is a cross-sectional view schematically illustrating a configuration of the lithium battery packaging material that is an embodiment to which the present invention is applied.

As shown in FIG. 1, the lithium battery packaging material (hereinafter, referred to simply as the "packaging material") 10 according to the embodiment is roughly composed of a substrate layer (SB) 11, an adhesive layer (AD) 12, an aluminum foil layer (AL) 13, a corrosion prevention treatment layer (CL) 14, an adhesive resin layer (AR) 15, and a sealant layer (SL) 16. More specifically, the lithium battery packaging material 10 is configured by the adhesive layer (AD) 12, the aluminum foil layer (AL) 13, the corrosion prevention treatment layer (CL) 14, the adhesive resin layer (AR) 15 and the sealant layer (SL) 16 being successively layered on one surface of the substrate layer (SB) 11.

<Substrate Layer (SB)>

The substrate layer (SB) 11 is provided in the lithium battery packaging material 10 for the purposes of imparting heat resistance during the sealing step of lithium battery production, and preventing pinholes from occurring during processing or distribution. A resin layer having insulating properties is preferably used as the substrate layer 11. Examples of resins that can be used include stretched films such as polyester films, polyamide films and polypropylene films or non-stretched films, which can be used as a single layer or as a multilayer film prepared by laminating two or more layers. Specifically, there can be used a multilayer stretched film obtained by coextruding a polyethylene terephthalate film (PET) and a nylon film (Ny) using an adhesive resin, followed by stretching treatment.

The thickness of the substrate layer (SB) 11 is preferably 6 to 40 μm, and more preferably 10 to 25 μm. If the thickness of the substrate layer (SB) 11 is less than 6 μm, the pinhole resistance and insulation properties tend to deteriorate. However, if the thickness of the substrate layer (SB) 11 is in excess of 40 μm, the packaging material becomes difficult to be formed.

<Adhesive Layer (AD)>

Materials that compose the adhesive layer (AD) 12A specifically include, for example, polyurethane-based adhesive obtained by allowing an isocyanate compound having two or more functional groups to act on a base resin such as a polyester polyol, polyether polyol, acrylic polyol or carbonate polyol.

The polyester polyol is obtained using one or more members from aliphatic dibasic acids such as succinic acid, glutaric acid, adipic acid, pimelic acid, suberic acid, azelaic acid, sebacic acid or brassylic acid; and aromatic dibasic acids such as isophthalic acid, terephthalic acid or naphthalenedicarboxylic acid, and one or more members from aliphatic diols such as ethylene glycol, propylene glycol, butanediol, neopentyl glycol, methylpentanediol, hexanediol, heptanediol, octanediol, nonanediol, decanediol or dodecanediol; alicyclic diols such as cyclohexanediol or hydrogenated xylylene glycol; and aromatic diols such as xylylene glycol.

The polyester polyol includes a polyester urethane polyol or the like obtained by chain-elongating hydroxyl groups on both ends of a polyester polyol that has been obtained using a dibasic and a diol mentioned above. The chain elongation is performed using an adduct, biuret or an isocyanurate form composed of an isocyanate compound alone or at least one compound selected from 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, isopropylidene dicyclohexyl-4,4'-diisocyanate, and the like.

Examples of the polyether polyol that can be used include ether-based polyols such as polyethylene glycol or polypropylene glycol, and polyether urethane polyols obtained by allowing the aforementioned isocyanate compounds as a chain extender to act on the aforementioned polyether polyols.

Examples of the acrylic polyol that can be used include acrylic resins obtained by polymerization using the previously described acrylic monomers.

The carbonate polyol can be obtained by reacting a carbonate compound with a diol. Examples of the carbonate compound that can be used include dimethyl carbonate, diphenyl carbonate and ethylene carbonate. Examples of the diol that can be used include carbonate polyols obtained by using a mixture of one or more members of aliphatic diols such as ethylene glycol, propylene glycol, butanediol, neopentyl glycol, methyl pentanediol, hexanediol, heptanediol, octanediol, nonanediol, decanediol and dodecanediol; alicyclic diols such as cyclohexanediol and hydrogenated xylylene glycol; aromatic diols such as xylylene glycol, and the like, or polycarbonate urethane polyols obtained by chain elongation using an aforementioned isocyanate compound.

These various polyols can be used alone or in combination of two or more, according to the functions and performance sought in the packaging material. Further, the use of an aforementioned isocyanate-based compound as a curing agent in these base resins enables their use as polyurethane-based adhesives.

Furthermore, a carbodiimide compound, oxazoline compound, epoxy compound, phosphorous compound or silane coupling agent and the like may be formulated in an aforementioned polyurethane resin for the purpose of promoting adhesion.

Examples of the carbodiimide compound include N,N'-di-o-tolylcarbodiimide, N,N'-diphenylcarbodiimide, N,N'-di-2,6-dimethylphenylcarbodiimide, N,N'-bis(2,6-diisopropylphenyl) carbodiimide, N,N'-dioctyldecylcarbodiimide, N-tolyl-N'-cyclohexylcarbodiimide, N,N'-di-2,2-di-t-butylphenylcarbodiimide, N-triyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-dicyclohexylcarbodiimide and N,N'-di-p-tolylcarbodiimide.

Examples of the oxazoline compound include monooxazoline compounds such as 2-oxazoline, 2-methyl-2-oxazoline, 2-phenyl-2-oxazoline, 2,5-dimethyl-2-oxazoline and 2,4-diphenyl-2-oxazoline; and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) and 2,2'-(1,4-phenylene)-bis(2-oxazoline).

Examples of the epoxy compound include: diglycidyl ethers of aliphatic diols such as 1,6-hexanediol, neopentyl glycol and polyalkylene glycol; polyglycidyl ethers of aliphatic polyols such as sorbitol, sorbitan, polyglycerol, pentaerythritol, diglycerol, glycerol and trimethylolpropane; polyglycidyl ethers of alicyclic polyols such as cyclohexane dimethanol; diglycidyl esters or polyglycidyl esters of aliphatic and aromatic polyvalent carboxylic acids such as terephthalic acid, isophthalic acid, naphthalene dicarboxylic acid, trimellitic acid, adipic acid and sebacic acid; diglycidyl ethers or polyglycidyl ethers of polyvalent phenols such as resorcinol, bis-(p-hydroxyphenyl)methane, 2,2-bis-(p-hydroxyphenyl) propane, tris-(p-hydroxyphenyl)methane and 1,1,2,2-tetrakis(p-hydroxyphenyl)ethane; N-glycidyl derivatives of amines such as N,N'-diglycidyl aniline, N,N,N-diglycidyl toluidine and N,N,N',N'-tetraglycidyl-bis-(p-aminophenyl)methane; triglycidyl derivatives of aminophenols; triglycidyltris(2-hydroxyethyl)isocyanurate; triglycidyl isocyanurate; ortho-cresol epoxies; and phenol novolac epoxies.

Examples of the phosphorous-based compound include tris(2,4-di-t-butylphenyl) phosphite, tetrakis(2,4-di-t-butylphenyl)4,4'-biphenylene phosphonite, bis(2,4-di-t-butylphenyl)pentaerythritol-di-phosphite, bis(2,6-di-t-butyl-4-methylphenyl)pentaerythritol-di-phosphite, 2,2-methylenebis(4,6-di-t-butylphenyl)octyl phosphite, 4,4'-butylidene-bis(3-methyl-6-t-butylphenyl-di-tridecyl)phosphite, 1,1,3-tris(2-methyl-4-ditridecylphosphite-5-t-butyl-phenyl)butane, tris (mixed mono- and di-nonylphenyl)phosphite, tris(nonylphenyl)phosphite and 4,4'-isopropylidenebis(phenyl-dialkylphosphite).

Examples of the silane coupling agent that can be used include various silane coupling agents such as vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane and N-β (aminoethyl)-γ-aminopropyltrimethoxysilane.

Further, various other additives and stabilizers may be formulated in an aforementioned polyurethane resin, according to the performance required of the adhesive.

The thickness of the adhesive layer (AD) 12 is not specifically limited, but is preferably in the range of 1 to 10 μm, and more preferably in the range of 3 to 7 μm.

<Aluminum Foil Layer (AL)>

Although ordinary soft aluminum foil can be used for the material of the aluminum foil layer (AL) 13, the use of an aluminum foil containing iron is preferable for the purpose of imparting greater pinhole resistance and extensibility during forming. The iron content in the aluminum foil is preferably in the range of 0.1 to 9.0 mass % in 100 mass % of aluminum foil, and more preferably in the range of 0.5 to 2.0 mass %. If the iron content is less than 0.1 mass %, it becomes difficult to sufficiently impart the pinhole resistance and the extensibility. If the iron content is in excess of 9.0 mass %, flexibility is impaired.

The thickness of the aluminum foil layer (AL) 13 is not specifically limited, but is preferably in the range of 9 to 200 μm, and more preferably in the range of 15 to 100 μm in consideration of the barrier properties, pinhole resistance and processability.

Untreated aluminum foil can be used as the aluminum foil, but aluminum foil that has been subjected to a degreasing treatment is used preferably in order to impart an electrolytic solution resistance. The degreasing treatment is broadly classified into a wet type degreasing treatment and a dry type degreasing treatment.

Examples of the wet type degreasing treatment include acid degreasing and alkaline degreasing (indicated in the description of the first corrosion prevention treatment layer (CL-1) 14-1 which is described below) and the like. As acid used in acid degreasing, an inorganic acid such as sulfuric acid, nitric acid, hydrochloric acid or hydrofluoric acid can be mentioned. These inorganic acids may be used singly or in combination of two or more. Further, various metal salts serving as supply sources of Fe ions or Ce ions and the like may be formulated into the inorganic acid as necessary, from the viewpoint of improving the aluminum foil etching effect. As alkali used in alkaline degreasing, a strong etching type alkali such as sodium hydroxide can be mentioned. A weak alkali or an alkali that is formulated with a surfactant may be used. These degreasing treatments are carried out by immersion or spraying.

As the dry type degreasing treatment, a method for performing a degassing treatment in a step of annealing aluminum can be mentioned. Besides the degreasing treatment, flame treatment or corona treatment may be performed. Furthermore, a degreasing treatment such as oxidatively decomposing and removing contaminants with active oxygen generated by irradiating with a specific wavelength of ultraviolet light may be used.

Note that, when the aluminum foil is degreased, only one surface of the aluminum foil may be degreased, or both surfaces may be degreased.

<Corrosion Prevention Treatment Layer (CL)>

The corrosion prevention treatment layer (CL) 14 is provided for preventing corrosion of the aluminum foil layer (AL) 13 due to the electrolytic solution and hydrofluoric acid. When providing the corrosion prevention treatment layer (CL) 14, good adhesion is required between the adhesive resin layer (AR) 15 and the corrosion prevention treatment layer (CL) 14. Therefore, if the adhesion between the adhesive resin layer (AR) 15 and the corrosion prevention treatment layer (CL) 14 can be maintained with a lower amount of heat, it is possible to further reduce the amount of heat during thermal lamination, and is effective in the point of inhibiting the blushing phenomenon.

To increase the adhesion between the adhesive resin layer (AR) 15 and the corrosion prevention treatment layer (CL) 14, a polymer composed of the modified polyolefin resin (A-1) contained in the adhesive resin layer (AR) 15 and having a functional group which reacts with an unsaturated carboxylic acid derivative component may be contained in the corrosion prevention treatment layer (CL) 14.

Specifically, if the polymer having the aforementioned functional group is a cationic polymer, reactivity is imparted due to the acid and base interaction, thus, it becomes possible to easily react with an unsaturated carboxylic acid derivative component with a low amount of heat, and the adhesion between the adhesive resin layer (AR) 15 and the corrosion prevention treatment layer (CL) 14 can be preferably maintained with a low amount of heat.

The cationic polymer may be one or more selected from the group consisting of polyethyleneimines, ionic polymer complexes made of a polyethyleneimine and a polymer having carboxylic acid, primary amine-grafted acrylic resins having a primary amine grafted to a main acrylic backbone, polyallylamines and derivatives thereof, and aminophenols.

As stated above, the corrosion prevention treatment layer (CL) 14 is provided for the purpose of preventing corrosion of the aluminum foil layer (AL) 13, thus, while the adhesion to the adhesive resin layer (AR) 15 increases due to the cationic polymer, it is necessary to impart a corrosion prevention function to the aluminum foil layer (AL) 13.

The corrosion prevention treatment layer (CL) 14 may be a single layer or may be a multilayer. In the case of a single layer, the aforementioned cationic polymer may be formulated in the corrosion prevention treatment layer (CL) 14 itself to form the single layer. However, in the case of a multilayer, as shown in FIG. 1, the first corrosion prevention treatment layer (CL-1) 14-1 which is directed to the prevention of corrosion of the aluminum foil layer (AL) 13 may be laminated with the second corrosion prevention treatment layer (CL-2) 14-2 containing the aforementioned cationic polymer which is directed to improving adhesion. Thus, the respective purposes are separate.

An example of the multilayer corrosion prevention treatment layer (CL) 14 will be described in detail below.

(First Corrosion Prevention Treatment Layer (CL-1))

The first corrosion prevention treatment layer (CL-1) 14-1 is formed by subjecting the aluminum foil layer (AL) 13 to a degreasing treatment, a hydrothermal modification treatment, an anodic oxidation treatment, a chemical conversion treatment, and the like. Further, these treatments may be performed in combinations.

Examples of the degreasing treatment include acid degreasing and alkaline degreasing, and examples of the acid degreasing include methods using an inorganic acid such as sulfuric acid, nitric acid, hydrochloric acid or hydrofluoric acid either alone or in the form of a mixture of these acids. Further, by using an acid degreasing agent obtained by dissolving a fluorine-containing compound such as monosodium ammonium difluoride with the aforementioned inorganic acids, in addition to obtaining aluminum degreasing effects, fluorides of aluminum can be formed in a passive state, which are effective in terms of hydrofluoric acid resistance. Examples of the alkaline degreasing include methods using sodium hydroxide and the like.

Examples of the hydrothermal modification treatment include boehmite treatment obtained by immersing aluminum foil in boiling water containing triethanolamine.

An example of anodic oxidation treatment is alumite treatment.

Examples of the chemical conversion treatment include chromate treatment, zirconium treatment, titanium treatment, vanadium treatment, molybdenum treatment, calcium phosphate treatment, strontium hydroxide treatment, cerium treatment, ruthenium treatment, and various chemical conversion treatments made up of mixed phases including the materials used in these treatments.

When performing the hydrothermal modification treatment, anodic oxidation treatment or chemical conversion treatment, the aforementioned degreasing treatment is preferably performed in advance.

Note that, among the aforementioned treatments, hot water hydrothermal modification treatment and anodic oxidation treatment cause the surface of the aluminum foil to be dissolved by the treatment agent, resulting in the formation of an aluminum compound (boehmite or alumite) that has superior corrosion resistance. Therefore, the hydrothermal modification treatment and the anodic oxidation treatment form a common continuous structure in the laminate structure from the aluminum foil layer (AL) 13 to the first corrosion prevention treatment layer (CL-1) 14-1. Therefore, the hydrothermal modification treatment and the anodic oxidation treatment are cases which are included in the definition of chemical conversion treatment. The first corrosion prevention treatment layer (CL-1) 14-1 can be formed by only a simple coating method as shown below which is not included in the definition of chemical conversion treatment.

The simple coating method refers to a method using a sol of a rare earth element oxide such as cerium oxide having a mean particle diameter of 100 nm or less having an aluminum corrosion preventive effect (inhibitory effect) and is also a preferable material in terms of environmental aspects. The use of this method makes it possible to form the first corrosion prevention treatment layer (CL-1) 14-1 which can prevent corrosion of metal foils such as aluminum foil even when using an ordinary coating method.

Examples of the aforementioned sol of rare earth element oxide include sols using various types of solvents such as aqueous, alcohol, hydrocarbon, ketone, ester and ether-based solvents, but aqueous sols are preferably used for the reasons stated as follows.

An inorganic acid such as nitric acid, hydrochloric acid, or phosphoric acid or a salt thereof, or an organic acid such as acetic acid, malic acid, ascorbic acid or lactic acid, is normally used as a dispersion stabilizer in the aforementioned sol of a rare earth element oxide in order to stabilize the dispersion of the sol. Among these dispersion stabilizers, phosphoric acid or a salt thereof in particular is expected to not only make a good "stable dispersion of the sol", but also "improve the adhesion of the aluminum foil layer (AL)" by utilizing the aluminum chelating ability of phosphoric acid, "impart electrolytic solution resistance" by scavenging (forming a passive state) aluminum ions that have eluted due to the effect of hydrofluoric acid, and, "improve cohesion of the oxide layer" by facilitating the occurrence of dehydration condensation of phosphoric acid even at low temperatures in the production of the packaging material of the present invention.

Examples of the phosphoric acid or salts thereof include orthophosphoric acid, pyrophosphoric acid, metaphosphoric acid, and alkali metal salts or ammonium salts thereof. Further, condensed phosphoric acids such as trimetaphosphoric acid, tetrametaphosphoric acid, hexametaphosphoric acid or ultrametaphosphoric acid as well as alkali metal salts or ammonium salts thereof are preferable for expressing function in the packaging material.

Specifically, by using the sol of a rare earth element oxide, in consideration of dry film forming properties (dry capacity and heat capacity) when forming a layer composed of a rare earth element oxide by various coating methods, because the agent has a good reactivity at low temperatures, a sodium salt having an excellent dehydration condensation property at low temperatures is preferably used as the alkali metal salt.

Further, the phosphoric acid salt is not particularly restricted, but a water-soluble salt is preferable.

When using cerium oxide as the rare earth element oxide and using phosphoric acid or a salt thereof as the dispersion stabilizer (i.e., when using a "ceria sol"), the formulation amounts thereof are preferably 1 to 100 parts by mass of the phosphoric acid or a salt thereof based on 100 parts by mass of cerium oxide. If the formulation amount of the phosphoric acid or a salt thereof is less than 1 part by mass, the stability of the sol of cerium oxide deteriorates, and satisfying the function as the packaging material becomes difficult. If the formulation amount of the phosphoric acid or a salt thereof is in excess of 100 parts by mass, the function of cerium oxide easily deteriorates.

The lower limit of the formulation amount of the phosphoric acid or a salt thereof is preferably 5 parts by mass. On the other hand, the upper limit is preferably 50 parts by mass or less, and 20 parts by mass or less is specifically preferable.

As the oxide layer (the first corrosion prevention treatment layer (CL-1) 14-1) formed by the aforementioned rare earth element oxide sol is an aggregate of inorganic particles, cohesion of the oxide layer formed per se is low even after going through a curing step. Therefore, the oxide layer is preferably conjugated by an anionic polymer as shown below in order to supplement the cohesion of the oxide layer.

A specific example of the anionic polymer is a polymer having a carboxyl group, examples of which include poly (meth)acrylic acid (or a salt thereof) and copolymers having poly(meth)acrylic acid as a main component thereof.

Examples of the components used as the copolymers include compounds obtained by copolymerizing alkyl (meth)acrylate-based monomers (of which examples of alkyl groups include a methyl group, ethyl group, n-propyl group, i-propyl group, n-butyl group, i-butyl group, t-butyl group, 2-ethylhexyl group and cyclohexyl group); amido group-containing monomers such as (meth)acrylamide, N-alkyl (meth)acrylamide, N,N-dialkyl (meth)acrylamide (of which examples of alkyl groups include a methyl group, ethyl group, n-propyl group, i-propyl group, n-butyl group, i-butyl group, t-butyl group, 2-ethylhexyl group and cyclohexyl group), N-alkoxy (meth)acrylamide, N,N-dialkoxy (meth)acrylamide (of which examples of alkoxy groups include a methoxy group, ethoxy group, butoxy group and isobutoxy group), N-methylol (meth)acrylamide or N-phenyl (meth)acrylamide; hydroxyl group-containing monomers such as 2-hydroxyethyl (meth)acrylate or 2-hydroxypropyl (meth)acrylate; glycidyl group-containing monomers such as glycidyl (meth)acrylate or allyl glycidyl ether; silane-containing monomers such as (meth)acryloxypropyl trimethoxysilane or (meth)acryloxypropyl triethoxysilane; and isocyanate group-containing monomers such as (meth) acryloxypropyl isocyanate.

These anionic polymers serve as materials used to improve the stability of the oxide layer obtained using the rare earth element oxide sol as previously described. The effects are to protect a hard, brittle oxide layer with an acrylic resin component and to trap (as a cation catcher) ionic contaminants (particularly, sodium ions) derived from phosphates contained in the rare earth oxide sol.

If ionic contaminants and alkali metal ions such as sodium ions or alkaline earth metal ions in particular, are contained in the protective layer provided to prevent corrosion of the aluminum foil by corrosive compounds, there is the problem that the protective layer is penetrated at the starting point of the ionic contamination. This problem is not specific to the present invention.

However, an anionic polymer immobilizes ionic contaminants such as sodium ions contained in the sol of a rare earth element oxide, and thus, can improve the resistance of the first corrosion prevention treatment layer (CL-1) 14-1.

By combining such an anionic polymer with the sol of a rare earth element oxide as the component forming the first corrosion prevention treatment layer (CL-1) 14-1 in the packaging material 10, corrosion prevention performance can be imparted that is equal to that of chromate treatment.

The structure in which a water-soluble anionic polymer is crosslinked with a cross-linking agent is preferable as the form of the anionic polymer.

The cross-linking agent includes a compound having an isocyanate group, a glycidyl group, a carboxyl group or an oxazoline group.

Examples of the compound having an isocyanate group include diisocyanates such as tolylene diisocyanate, xylylene diisocyanate, and hydrogenation products thereof; hexamethylene diisocyanate, 4,4'-diphenylmethane diisocyanate and hydrogenation products thereof; and isophorone diisocyanate; or adducts prepared by reacting these isocyanates with a polyhydric alcohol such as trimethylolpropane, and biurets obtained by reacting the above isocyanates with water; or polyisocyanates such as isocyanurates (which are trimers), or blocked polyisocyanates in which these polyisocyanates are blocked with an alcohol, a lactam or an oxime or the like.

Examples of the compound having a glycidyl group include epoxy compounds obtained by the interaction between a glycol such as ethylene glycol, diethylene glycol, triethylene glycol, polyethylene glycol, propylene glycol, dipropylene glycol, tripropylene glycol, polypropylene glycol, 1,4-butanediol, 1,6-hexanediol or neopentyl glycol, and epichlorohydrin; epoxy compounds obtained by the interaction between a polyhydric alcohol such as glycerol, polyglycerol, trimethylolpropane, pentaerythritol or sorbitol, and epichlorohydrin; and epoxy compounds obtained by the interaction between a dicarboxylic acid such as phthalic acid, terephthalic acid, oxalic acid or adipic acid, and epichlorohydrin.

Examples of the compound having a carboxyl group include the various aliphatic or aromatic dicarboxylic acids, as well as poly(meth)acrylic acids, and alkali (or alkaline earth) metal salts of poly(meth)acrylic acids.

Examples of compounds having an oxazoline group include low molecular weight compounds having two or more oxazoline units, or in cases where a polymerizable monomer such as isopropenyloxazoline is used, a compound copolymerized with an acrylic monomer such as (meth) acrylic acid, alkyl ester (meth)acrylate, hydroxyalkyl (meth) acrylate or the like may be used.

Further, as the cross-linking agent, the use of a silane coupling agent that is capable of causing a selective reaction between the amines and the functional groups, and making the cross-linking points be siloxane bonds, is possible. In this case, the silane coupling agent includes γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropyltriethoxysilane. Specifically, considering the reactivity with the cationic polymer or copolymer thereof, epoxysilane, aminosilane, or isocyanate silane are optimal as the silane coupling agent.

The cross-linking agent is preferably added in an amount of 1 to 50 parts by mass per 100 parts by mass of the anionic polymer, and 10 to 20 parts by mass is more preferable. If the formulation amount of the cross-linking agent is less than 1 part by mass, then the cross-linking structure may be insufficient. In contrast, if the blend amount is in excess of 50 parts by mass, then there is the risk that the pot life of the coating liquid may deteriorate.

The method used to crosslink the water-soluble polymer is not limited to the aforementioned crosslinking agents, and may be a method including formation of a crosslinked structure such as ionic crosslinks using a titanium or zirconium compound.

Conventionally, aluminum foil has been subjected to a chemical conversion treatment such as chromate treatment in order to impart a resistance such as electrolytic solution resistance, water resistance, or hydrofluoric acid resistance to the packaging material. As described above, the chemical conversion treatment specifically uses a chemical conversion treatment agent which is formulated with hydrofluoric acid, hydrochloric acid, sulfuric acid, nitric acid, or salts thereof to subject an aluminum foil to a treatment to form a graded structure between the aluminum foil layer (AL) and the chemical conversion treatment layer, and uses chromium-based and non-chromium-based compounds to form the chemical conversion treatment layer on the aluminum foil. Because these chemical conversion treatment agents use acids, they tend to cause corrosion of the operating environment and the coating apparatus.

However, as stated above, the method for forming the first corrosion prevention treatment layer (CL-1) 14-1 by a coating method is different than the chemical conversion treatment typified by chromate treatments, thus, it is not necessary to form a graded structure between the aluminum foil layer (AL) 13 and the first corrosion prevention treatment layer (CL-1) 14-1, and differs from the definition of a chemical conversion treatment such as chromate treatment in this point.

Further, the state of the coating agent is not restricted to acidic, alkaline, or neutral, thereby making it a treatment method that offers a superior working environment. Furthermore, this is also deeply interesting from the viewpoint of a corrosion prevention technical field for which an alternative is desired in consideration of the environmental health of chromium compounds used in chromate treatment.

(Second Corrosion Prevention Treatment Layer (CL-2))

The second corrosion prevention treatment layer (CL-2) 14-2 includes the aforementioned cationic polymer to improve the adhesion with the first corrosion prevention treatment layer (CL-1) 14-1 and the adhesive resin layer (AR) 15.

The cationic polymer includes polymer containing an amine, and specifically, as stated above, is preferably at least one member selected from the group consisting of polyethyleneimines, ionic polymer complexes made of a polyethyleneimine and a polymer having carboxylic acid groups, primary amine-grafted acrylic resins having a primary amine grafted to a main acrylic backbone, polyallylamines or their derivatives, and aminophenols.

Examples of the polymer having a carboxylic acid that forms an ionic polymer complex with polyethylene imine include polycarboxylic acids (salts) such as polyacrylic acid or an ionic salt thereof, or copolymers obtained by introducing a co-monomer therein, and polysaccharides having a carboxyl group such as carboxymethyl cellulose or an ionic salt thereof.

Examples of the polyallylamines that can be used include homopolymers or copolymers such as of allylamines, allylamine amidosulfate, diallylamines or dimethylallylamine. Furthermore, these amines can be used in the form of free amines or may be stabilized by acetic acid or hydrochloric acid. Further, maleic acid or sulfur dioxide and the like can be used as copolymer components. Furthermore, polyallylamines imparting thermal crosslinkability by partial methoxylation of a primary amine can also be used. Further, aminophenols can also be used.

Allylamines and derivatives thereof are particularly preferable as the cationic polymer.

In the present embodiment, cationic polymers are described as constituent members composing the corrosion prevention treatment layer (CL) 14. The reason for this is that cationic polymers are compounds which can impart the electrolytic solution resistance and the hydrofluoric acid resistance required by the lithium battery packaging material. This is assumed to be the result of inhibiting the damage to the aluminum foil by capturing fluorine ions with the cationic groups of the cationic polymer (anion catcher).

Further, cationic polymers are compounds which are remarkably preferable in the point of improving the adhesion between the first corrosion prevention treatment layer (CL-1) 14-1 and the adhesive resin layer (AR) 15, and thus, are ideal as constituent members forming the corrosion prevention treatment layer (CL) 14.

As cationic polymers are water soluble, they are preferably used to form a crosslinked structure by a cross-linking agent in the same manner as the aforementioned anionic polymers, and it is possible to impart water resistance to the cationic polymer thereby. Examples of the cross-linking agent includes the cross-linking agents indicated previously in the explanation of the anionic polymer.

Therefore, if the cationic polymer forms a crosslinked structure, in the case when using the sol of a rare earth element oxide as the element for constructing the aforementioned corrosion prevention treatment layer (CL-1) 14-1, the cationic polymer may be used instead of an anionic polymer for the protective layer thereof.

As stated above, the packaging material 10 according to the present embodiment has been described for the case when the corrosion prevention treatment layer (CL) 14 is a multilayer. However, when the corrosion prevention treatment layer (CL) 14 is a single layer, the single corrosion prevention treatment layer (CL) 14 that is provided with both a corrosion prevention function and adhesion can be formed by using a coating agent incorporating phosphoric acid and a chromium compound in a resin binder such as aminophenol in the manner of a known technology in the form of a chromate coating.

Further, the corrosion prevention treatment layer (CL) 14 may be formed by using the coating agent (i.e., the coating liquid mixed with the material having the corrosion prevention function and the cationic polymer) obtained by preliminarily incorporating the aforementioned sol of a rare earth element oxide and the cationic polymer. However, the stability of the coating liquid must be taken into consideration in this case.

The corrosion prevention treatment layer (CL) 14, even if a single layer or a multilayer, is preferably provided so as to have a mass (the amount applied and the mass per unit surface area) in the range of 0.005 to 0.200 $g/m^2$, and more preferably formed so as to have a mass (the amount applied and the mass per unit surface area) in the range of 0.010 to 0.100 $g/m^2$. When the mass per unit surface area of the corrosion prevention treatment layer (CL) 14 is less than 0.005 $g/m^2$, the corrosion prevention function of the aluminum foil layer (AL) 13 deteriorates. When the mass per unit surface area of the corrosion prevention treatment layer (CL) 14 is greater than 0.200 $g/m^2$, the performance of the corrosion prevention function becomes saturated, and when using the sol of a rare earth element oxide, thermal curing during drying becomes inadequate if the coated film is excessively thick, which results in the risk of an accompanying decrease in cohesion.

In the present embodiment, although the thickness of the corrosion prevention treatment layer (CL) 14 is described in terms of the mass per unit surface area, this can be converted to thickness provided the specific gravity is known.

Note that, the packaging material 10 shown in FIG. 1 describes an example in which the corrosion prevention treatment layer (CL) 14 is provided on the surface (opposite surface) close to the adhesive resin layer (AR) 15 of the aluminum foil layer (AL) 13, but the present invention is not limited by this form. Specifically, the corrosion prevention treatment layer (CL) 14 subjected to a similar treatment can be provided on the surface close to the adhesive layer (AD) 12 of the aluminum foil layer (AL) 13.

<Adhesive Resin Layer (AR)>

The adhesive resin layer (AR) 15 is roughly comprised of an adhesive resin composition as the main component and the additive components.

The adhesive resin composition contains the modified polyolefin resin (a) component and a macrophase-separated thermoplastic elastomer (b) component.

(Modified Polyolefin Resin (a))

The modified polyolefin resin (a) is preferably a resin in which a polyolefin resin has been graft-modified by an unsaturated carboxylic acid derivative component derived from any of an unsaturated carboxylic acid, an unsaturated carboxylic acid anhydride, or an unsaturated carboxylic acid ester.

Examples of the polyolefin resin include low density polyethylene, medium density polyethylene, high density polyethylene, ethylene-α-olefin copolymers, homo-, block- or random polypropylene, or propylene-α-olefin copolymer.

Examples of the compound used when graft-modifying these polyolefin resins include an unsaturated carboxylic acid derivative component derived from any of unsaturated carboxylic acid, unsaturated carboxylic acid anhydride, and unsaturated carboxylic acid ester.

Specifically, examples of the unsaturated carboxylic acid include acrylic acid, methacrylic acid, maleic acid, fumaric acid, itaconic acid, citraconic acid, tetrahydrophthalic acid and bicyclo[2.2.1]hept-2-ene-5,6-dicarboxylic acid.

Examples of the unsaturated carboxylic acid anhydride include maleic anhydride, itaconic anhydride, citraconic anhydride, tetrahydrophthalic anhydride and bicyclo[2.2.1]hept-2-ene-5,6-dicarboxylic acid anhydride.

Examples of the unsaturated carboxylic acid ester include methyl acrylate, methyl methacrylate, ethyl methacrylate, butyl methacrylate, dimethyl maleate, monomethyl maleate, diethyl fumarate, dimethyl itaconate, diethyl citraconate, dimethyl-tetrahydrophthalic anhydride and dimethyl bicyclo[2.2.1]hept-2-ene-5,6-dicarboxlyate.

The acid-modified polyolefin resin (a) can be produced by graft polymerizing (graft modifying) 0.2 part by mass to 100 parts by mass of the aforementioned unsaturated carboxylic acid derivative component with 100 parts by mass of the base polyolefin resin under heating conditions in the presence of a radical initiator.

The reaction temperature is preferably 50 to 250° C., and more preferably 60 to 200° C.

Although suitably set according to the production method, the reaction time in the case of a molten graft reaction using a twin-screw extruder, for example, is equal to or less than the residence time in the extruder, and more specifically, is preferably 2 minutes to 30 minutes and more preferably 5 minutes to 10 minutes.

Graft modification can be carried out under conditions of either normal pressure or under pressurization.

Examples of the radical initiator used in graft modification include organic peroxides such as alkyl peroxides, aryl peroxides, acyl peroxides, ketone peroxides, peroxyketals, peroxycarbonates, peroxyesters and hydroperoxides.

These organic peroxides can be suitably selected according to the aforementioned conditions of reaction temperature and reaction time. For example, in the case of a molten graft reaction using a twin-screw extruder, an alkyl peroxide, peroxyketal or peroxyester is preferable, and more specifically, di-t-butyl peroxide, 2,5-dimethyl-2,5-di-t-butylperoxy-hexine-3-benzene or dicumyl peroxide is preferable.

A polyolefin resin that has been modified with maleic anhydride is preferable for the modified polyolefin resin (a). Examples thereof include Admer (trade name) manufactured by Mitsui Chemicals Inc., Modic (trade name) manufactured by Mitsubishi Chemical Corp., and Adtex (trade name) manufactured by Nippon Polyethylene Corp.

This kind of modified polyolefin resin (a) components exhibits good reactivity with a polymer having various metals or various functional groups, thus, adhesion can be imparted to the adhesive resin layer (AR) 15 using the reactivity, and the electrolytic solution resistance can improve.

(Macrophase-separated Thermoplastic Elastomer (b))

The macrophase-separated thermoplastic elastomer (b) forms a macrophase-separated-structure having a dispersed phase size in a range in excess of 200 nm, to 50 μm or less, relative to the modified polyolefin resin (a).

By the adhesive resin composition comprising a macrophase-separated thermoplastic elastomer (b) component, the residual stress generated during lamination of the modified polyolefin resin (a) component and the like which is the main component for forming the adhesive resin layer (AR) 15 can be released, and it is possible to impart thermoplastic adhesion to the adhesive resin layer (AR) 15. Therefore, the adhesion of the adhesive resin layer (AR) 15 can further increase, and the packaging material 10 having good electrolytic solution resistance can be obtained.

The macrophase-separated thermoplastic elastomer (b) is present in the form of a sea-island structure on the modified polyolefin resin (a), but if the dispersed phase size is 200 nm or less, it becomes difficult to impart an improvement of viscoelastic adhesion. On the other hand, if the dispersed phase size is in excess of 50 μm, since the modified polyolefin resin (a) and the macrophase-separated thermoplastic elastomer (b) are substantially incompatible, the lamination suitability (processability) decreases considerably and it becomes easy for the material physical strength of the adhesive resin layer (AR) 15 to deteriorate. The dispersed phase size is preferably 500 nm to 10 μm.

Examples of the macrophase-separated thermoplastic elastomer (b) include a polyolefin-based thermoplastic elastomer obtained by copolymerizing at least one of ethylene and propylene with a member selected from α-olefin selected from the group consisting of 1-butene, 1-pentene, 1-hexene, 1-octene and 4-methyl-1-pentene.

Further, commercially available products can be used as the macrophase-separated thermoplastic elastomer (b) component, for example, Tafiner (trade name) manufactured by Mitsui Chemicals Inc., Zelas (trade name) manufactured by Mitsubishi Chemical Corp., or Catalloy (trade name) manufactured by Montell Co is suitable.

In the adhesive resin layer (AR) 15, the content of macrophase-separated thermoplastic elastomer (b) component relative to the modified polyolefin resin (a) component in the adhesive resin composition is preferably 1 to 40 parts by mass with respect to 100 parts by mass of the modified polyolefin resin (a) component, and more preferably 5 to 30 parts by mass. If the content of the macrophase-separated thermoplastic elastomer (b) component is less than 1 part by mass, the improvement of the adhesion of the adhesive resin layer (AR) cannot be anticipated. On the other hand, if the content of the macrophase-separated thermoplastic elastomer (b) component is in excess of 40 parts by mass, essentially, the processability remarkably deteriorates due to the compatibility between the modified polyolefin resin (a) component and the macrophase-separated thermoplastic elastomer (b) component being low. Further, the macrophase-separated thermoplastic elastomer (b) component is not a resin which shows adhesion, thus, the adhesion of the adhesive resin layer (AR) 15 to another layer such as the sealant layer (SL) 16 or the corrosion prevention treatment layer (CL) 14 easily deteriorates.

(Polypropylene or Propylene-α-Olefin Copolymer (A) Having an Atactic Structure)

The adhesive resin layer (AR) 15 is characterized in that it contains the polypropylene or the propylene-α-olefin copolymer having an atactic structure (hereinafter, simply referred to as "Component (A)") as the additive component. Component (A) is a perfect amorphous resin component.

The polypropylene or the propylene-α-olefin copolymer having an atactic structure means that the orientation of the side chain of at least one of propylene and α-olefin is an atactic structure. In other words, the following four cases can be provided as such a configuration.

(1) The case when the orientation of the side chain of the propylene chain of polypropylene is an atactic structure.

(2) The case when the orientation of the side chain of the propylene chain in the propylene-α-olefin copolymer is an atactic structure.

(3) The case when the orientation of the side chain of the α-olefin chain in the propylene-α-olefin copolymer is an atactic structure.

(4) The case when the orientation of the side chain of the propylene/α-olefin combined chain in the propylene-α-olefin copolymer is an atactic structure.

The atactic structure of the propylene-α-olefin copolymer according to the embodiment of the present invention can be confirmed from, for example, the following method. This method, first, uses a transition metal complex used for the polymerization of the propylene-α-olefin copolymer according to the embodiment of the present invention to polymerize a homopolypropylene. When each signal intensity expressed as [mm], [mr], and [rr] attributed to mm, mr, and rr of the propylene methyl carbon is determined from the $^{13}$C-NMR spectrum, F(1) as defined by the following formula can be obtained. When the value of F(1) obtained by the formula is 40 to 60, inclusive, preferably 43 to 57, and further preferably 45 or to 55, it can be judged that the homopolypropylene obtained by the abovementioned polymerization has an atactic structure.

$$F(1)=100\times[mr]/([mm]+[mr9+[rr])$$

The effect of adding the additive component (A) serving as the main component to the adhesive resin composition, in the adhesive resin layer (AR) 15 will be explained.

Component (A) is compatible with the modified polyolefin resin (a) component in the adhesive resin composition in a state in which the adhesive resin layer (AR) 15 is molten, but is discharged to the outside of the crystal when crystallized due to cooling, and separates in phase. Accordingly, component (A) does not interfere with the degree of crystallization of the modified polyolefin resin (a) component in the adhesive resin composition which is the main component.

Further, by adding Component (A) to the adhesive resin layer (AR) 15, the concentration of the modified polyolefin resin (a) component is diluted by Component (A) and the crystal growth is inhibited, thus, it is possible to reduce the crystal size (spherulite size) of the adhesive component (i.e., the modified polyolefin resin (a) component) of the base resin. Further, Component (A) which has been discharged outside the crystal is uniformly dispersed in the periphery of the micro-spherulites of the modified polyolefin resin (a) component.

It is conventionally known that the "blushing phenomenon" is generated when cold forming the packaging material. The mechanism of the blushing phenomenon will be explained by way of an example of the adhesive resin layer (AR) 15 shown in part (a) of FIG. 2. In the adhesive resin layer (AR) 15, the macrophase-separated thermoplastic elastomer (b) 15b is formulated in the modified polyolefin resin (a) 15a.

(1) The modified polyolefin resin (a) 15a in the adhesive resin layer (AR) 15 is crystallized by a heat treatment at the time of thermal lamination.

(2) The modified polyolefin resin (a) 15a and the macrophase-separated thermoplastic elastomer (b) 15b are incompatible, thus, strain occurs at both interfaces due to the behavior of the crystallization of (i).

Figure 2:
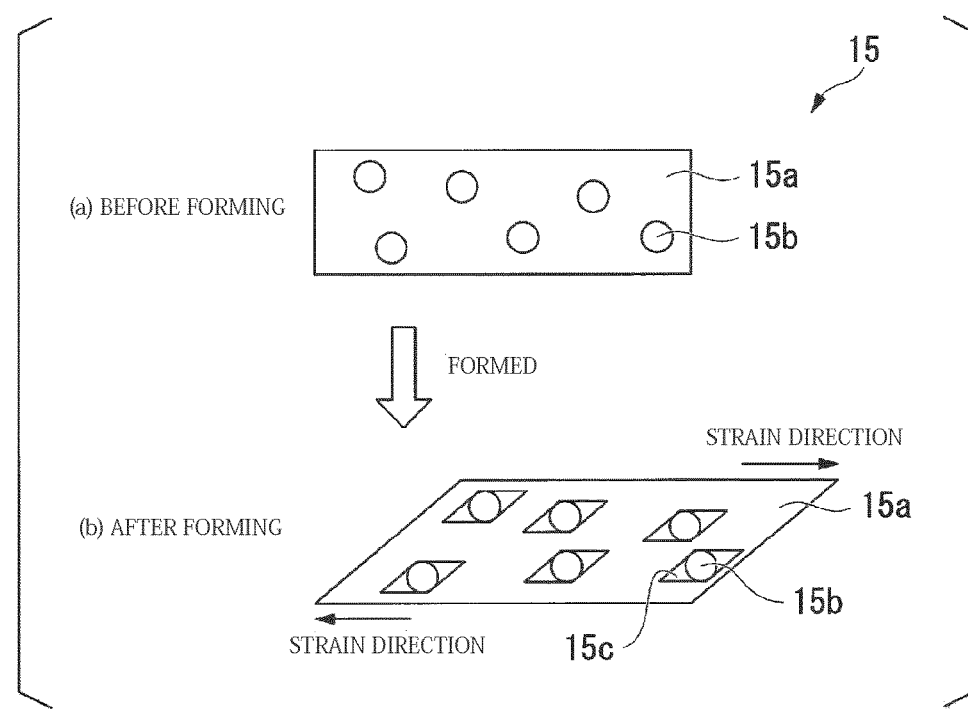
FIG. 2 is a schematic view illustrating an example of a mechanism of the blushing phenomenon.

(3) Cracks occur in both interfaces and voids and craze 15c are formed by adding stress during forming (FIG. 2 part (b)).

(4) Light is scattered by the voids and craze 15c and the blushing phenomenon occurs due to the irregular reflection of optical light.

Namely, to prevent the blushing phenomenon, it is known to be important that "the crystallization of the modified polyolefin resin (a) does not progress (i.e., crystallization is difficult to perform) by the amount of heat during thermal lamination" and "the adhesion between the modified polyolefin resin (a) and the macrophase-separated thermoplastic elastomer (b) is improved".

With respect thereto, the packaging material 10 according to the present embodiment can minimize the crystal size (spherulite size) of the modified polyolefin resin (a) component by adding Component (A) as the additive component to the adhesive resin composition which is the main component of the adhesive resin layer (AR) 15, thus, flexible and tenacious film properties can be obtained. Further, by uniformly dispersing (A) in the periphery of (a), a uniform stress relaxation is possible and, the generation of voids and craze is possible, thus, it is considered to be possible to mitigate the "blushing phenomenon" of the packaging material 10 which accompanies the stress during molding.

As stated above, the transparency of the adhesive resin layer (AR) 15 can be increased and the blushing phenomenon accompanying the stress during forming can be mitigated by adding the resin Component (A) as the additive component to the adhesive resin composition which is the main component of the adhesive resin layer (AR) 15. Thus, blushing during forming also improves and the improvement of the insulating property accompanying the bending stress (the bending resistance) of the packaging material 10 becomes possible. Further, the degree of crystallization of the modified polyolefin resin component (a) in the adhesive resin layer (AR) 15 can be maintained while being able to impart flexibility, thus, it is possible to inhibit the deterioration of the strength of lamination during the electrolytic solution swelling of the packaging material 10.

The ratio of Component (A) in the adhesive resin layer (AR) 15 preferably has a lower limit of 2.5 wt %, and more preferably 5 wt % or more. However, the upper limit is preferably 60 wt %. If the ratio of Component (A) in the adhesive resin layer (AR) 15 is less than 2.5 wt %, the effect by adding Component (A) as described above cannot be sufficiently obtained. On the other hand, if in excess of 60 wt % (i.e., if the ratio of the adhesive resin composition is less than 40 wt %), the adhesion of the adhesive resin layer (AR) 15 to another layer such as the sealant layer (SL) 16 or the corrosion prevention treatment layer (CL) 14 easily deteriorates.

(Propylene-α-Olefin Copolymer Having an Isotactic Structure (B))

The adhesive resin layer (AR) 15 preferably contains a propylene-α-olefin copolymer having an isotactic structure (hereinafter, simply referred to as "Component (B)") in addition to the abovementioned Component (A) as the additive component.

Component (B) is used as a compatible rubber component, when the modified polyolefin resin (a) in the adhesive resin component which is the main component of the adhesive resin layer (AR) 15 is specifically a polypropylene-based adhesive resin, and prevents the crystallization of the modified polyolefin resin (a).

Namely, the packaging material 10 according to the present embodiment provides the flexibility for relaxing the stress, by further adding Component (B) as the additive component to the adhesive resin component which is a main component of the adhesive resin layer (AR) 15. Therefore, the deterioration of the electrolytic solution lamination strength is prevented and improvement is achieved in the heat sealing strength (particularly, the electrolytic solution resistance) and the degassing sealing strength. Further, the blushing phenomenon and the bending insulation resistance can be further improved by combining Component (A) with Component (B) as the additive components.

The ratio of the additive components (i.e., the total of Component (A) and Component (B)) in the adhesive resin layer (AR) 15 is preferably 5 to 60 wt %. If the ratio of the additive components in the adhesive resin layer (AR) 15 is less than 5 wt % (i.e., if the ratio of the adhesive resin composition is in excess of 95 wt %), the effect cannot be sufficiently obtained by adding the additives as described above. On the other hand, if in excess of 60 wt % (i.e., if the ratio of the adhesive resin composition is less than 40 wt %), the adhesion of the adhesive resin layer (AR) 15 to another layer such as the sealant layer (SL) 16 or the corrosion prevention treatment layer (CL) 14 can more easily deteriorate.

Note that, Component (A) which is the active component in the adhesive resin layer (AR) 15 can be analyzed using nuclear magnetic resonance spectrometry (NMR) to determine the quantity by the steric regularity evaluation.

On the other hand, the analysis of Component (B) can be analyzed using Fourier transform type near-infrared spectrometric method (FT-IR), and the formulation ratio can be verified by creating a calibration curve by an absorber attributed to the branching of α-olefin, and an absorber attributed to the specific absorber of the modified polyolefin resin (a).

The adhesive resin layer (AR) 15 may contain, other than the adhesive resin composition (i.e., the modified polyolefin resin (a) component or the macrophase-separated thermoplastic elastomer (b) component) and an additive component (i.e., Component (A) or Component (B)), various additives as necessary, such as a flame retardant, slipping agent, anti-blocking agent, antioxidant, photostabilizer, or pressure-sensitive adhesion promoter, and the like.

The thickness of the adhesive resin layer (AR) 15 is not specifically limited, but is preferably the same or less than that of the sealant layer from the viewpoints of the stress relaxation and the permeability of moisture and the electrolytic solution.

<Sealant Layer (SL)>

Sealability is sought in the sealant layer (SL) 16 by heat sealing the packaging material 10. Typically, materials for the sealant layer (SL) 16 include polyolefin resins such as low density polyethylene, medium density polyethylene, high density polyethylene, ethylene-α-olefin copolymers, homo-, block- or random polypropylene, propylene-α-olefin copolymer, ethylene-vinyl acetate copolymers, ethylene-(meth)acrylic acid copolymers and esterification products or ionic crosslinking products thereof. The sealant layer (SL) 16 may be made up of a single layer of a material obtained by formulating one, or two or more aforementioned components, or may form a multilayer structure in accordance with other performance requirements of the sealant. The multilayer structure can include interposition of a resin having gas barrier properties, such as a partially saponified or completely saponified ethylene-vinyl acetate copolymer or partially saponified or completely saponified polyvinyl acetate copolymer.

The thickness of the sealant layer (SL) 16 is not particularly limited, but specifically, the range of 5 to 100 µm is preferable, and the range of 10 to 60 µm is more preferable.

<Production Method of the Lithium Battery Packaging Material>

Next, an example of the production method of the packaging material 10 shown in FIG. 1 (i.e., the lithium battery packaging material according to the embodiment) will be described.

The production method of the packaging material 10 according to the present embodiment roughly includes a step of laminating a corrosion prevention treatment layer (CL) 14 to an aluminum foil layer (AL) 13, a step of bonding a substrate layer (SB) 11 with an aluminum foil layer (AL) 13, a step of further laminating an adhesive resin layer (AR) 15 with a sealant layer (SL) 16 to produce a laminate, and a step of heat treating the obtained laminate.

(Step of Laminating the Corrosion Prevention Treatment Layer (CL) to the Aluminum Foil Layer (AL))

In the present step, the corrosion prevention treatment layer (CL) 14 is formed on the aluminum foil layer (AL) 13. Examples of the method include, as stated above, subjecting the aluminum foil layer (AL) 13 to a degreasing treatment, a hydrothermal modification treatment, an anodic oxidation treatment, or a chemical conversion treatment, and coating the aluminum foil layer (AL) 13 with a coating agent having the corrosion prevention performance.

Further, when the corrosion prevention treatment layer (CL) 14 is a multilayer, as shown in FIG. 1, the coating liquid (coating agent) for producing the first corrosion prevention treatment layer (CL-1) 14-1 is coated on the aluminum foil layer (AL) 13. The coated film is baked to form the first corrosion prevention treatment layer (CL-1) 14-1. Then, the coating liquid (coating agent) for producing the second corrosion prevention treatment layer (CL-2) 14-2 is coated on the first corrosion prevention treatment layer (CL-1) 14-1. The coated film is baked to form the second corrosion prevention treatment layer (CL-2) 14-2. Further, the second corrosion prevention treatment layer (CL-2) 14-2 can be formed in the step of laminating the adhesive resin layer (AR) 15 and the sealant layer (SL) 16 which will be described below.

The degreasing treatment may be carried out by spraying and immersion, the hydrothermal modification treatment and the anodic oxidation treatment may be carried out by immersion, and chemical conversion treatment can be selected from among immersion, spraying and coating corresponding to the type of chemical conversion treatment.

Various methods such as gravure coating, reverse coating, roll coating or bar coating can be employed as the method for coating the coating agent having corrosion prevention performance.

As stated above, either both sides or one side of the aluminum foil may be subjected to the treatments, but when one side is subjected to the treatments, the treatment surface is the surface which is laminated with the adhesive resin layer (AR) layer 15. Note that, the surface of the substrate layer (SB) 11 may be subjected to the aforementioned treatments in accordance with need.

Further, the amount of the coating agent applied is preferably 0.005 to 0.200 g/m$^2$, and more preferably 0.010 to 0.100 g/m$^2$.

Further, in the case when curing is necessary, curing can be performed in the range of 60 to 300° C. as the base material temperature in accordance with the drying conditions of the corrosion prevention treatment layer (CL) 14 to be used.

(Step of Bonding the Substrate Layer (SB) and the Aluminum Foil Layer (AL))

In the present step, an aluminum foil layer (AL) 13 provided with a corrosion prevention treatment layer (CL) 14 is bonded to a substrate layer (SB) 11 through the adhesive layer (AD) 12. The bonding method uses a technique such as dry lamination, non-solvent lamination or wet lamination, and bonds the aluminum foil layer (AL) 13 provided with the corrosion prevention treatment layer (CL) 14 to the substrate layer (SB) 11 by the material forming the aforementioned adhesive layer (AD) 12. The adhesive layer (AD) 12 is provided in a coating amount in the range of 1 to 10 g/m$^2$, and more preferably a coating amount in the range of 3 to 7 g/m$^2$ in terms of dry coating amount.

(Step of Laminating the Adhesive Resin Layer (AR) and the Sealant Layer (SL))

In the present step, the adhesive resin layer (AR) 15 and the sealant layer (SL) 16 are formed on the corrosion prevention treatment layer (CL) 14 that has been formed in the previous steps. The method includes using an extrusion laminator to sandwich-laminate the adhesive resin layer (AR) 15 and the sealant layer (SL) 16 together. Furthermore, it is possible to laminate by a tandem lamination method or a co-extrusion method which extrudes the adhesive resin layer (AR) 15 with the sealant layer (SL) 16.

As shown in FIG. 1, through this step, there is obtained a laminate in which each layer is laminated in the sequence of the substrate layer (SB) 11/the adhesive (AD) 12/the aluminum foil layer (AL) 13/the corrosion prevention treatment layer (CL) 14/the adhesive resin layer (AR) 15/the sealant layer (SL) 16.

When laminating the adhesive resin layer (AR) 15, materials that are dry-blended so as to have a composition of the material formulation mentioned above may be directly laminated with an extrusion laminator, or a granulated adhesive resin layer (AR) 15 obtained by melt-blending the materials using a melt blending device such as a single-screw extruder, twin-screw extruder or Brabender mixer may be laminated with an extrusion laminator. Further, when forming the multilayer corrosion prevention treatment layer (CL) 14, if the extrusion laminator has a unit capable of applying an anchor coating, the second corrosion prevention treatment layer (CL-2) 14-2 may be coated by the unit.

(Heat Treatment Step)

In the present step, the laminate is heat treated. By heat treating the laminate, the adhesion between the aluminum foil layer (AL) 13/the corrosion prevention treatment layer (CL) 14/the adhesive resin layer (AR) 15/the sealant layer (SL) 16 improves, and a more superior electrolytic solution resistance and hydrofluoric acid resistance can be imparted. Note that, the packaging material 10 according to the present embodiment includes the adhesive resin layer (AR) 15 that contains the polypropylene or the propylene-α-olefin copolymer having an atactic structure (Component (A)) as at least the additive component, thus, the blushing phenomenon during formation of the adhesive resin layer (AR) 15 is prevented. However, when the heating and cooling are insufficient, the crystallization of the adhesive resin layer (AR) and the sealant layer (SL) 16 progresses, and the blushing phenomenon is generated by strain during forming.

Therefore, in the present step, a heat treatment is preferably performed to the extent that the adhesion between each of the aforementioned layers improves and the crystallization of the adhesive resin layer (AR) 15 and the sealant layer (SL) 16 does not progress. The temperature of the heat treatment depends on the materials for producing the adhesive resin layer (AR) 15 and the sealant layer (SL) 16. A measure of the temperature when conducting the heat treatment is preferably the melting point [Tm(AR) or Tm(SL)]+20 to 100° C., and more preferably is +20 to 60 [Tm(AR) or Tm(SL)] ° C., that is the maximum attainable temperature of the laminate. When the maximum attainable temperature of the laminate is less than this range, the crystallization easily progresses from the remaining crystal nucleus. However, if the maximum attainable temperature of the laminate exceeds this range, there is the possibility that, for example, the thermal expansion of the aluminum foil and the thermal shrinkage of the substrate layer (SB) after bonding occur, and the processability and the characteristics deteriorate. Therefore, the heat treatment time is dependent upon the treatment temperature, but is desirably performed for a short time (for example, less than 30 seconds).

Further, the cooling is preferably performed rapidly in order to inhibit the crystallization. A cooling rate in the range of 50 to 100° C./second is preferable.

With respect thereto, the packaging material 10 according to the present embodiment can be produced as shown in FIG. 1.

As stated above, according to the packaging material 10 of the present embodiment, the adhesive resin layer (AR) 15 contains an adhesive resin composition and the polypropylene or the propylene-α-olefin copolymer having an atactic structure (Component (A)), and thus, exhibits good lamination strength, blushing resistance and bending resistance. Further, when the adhesive resin layer (AR) 15 contains a propylene-α-olefin copolymer having an isotactic structure (Component (B)), the heat sealing strength and the degassing sealing strength of the packaging material 10 are further improved.

The technical scope of the present invention is not limited to the above embodiment, and various modifications may be made without departing from the spirit of the invention.

The effect of the present invention will be further described below by way of Examples and Comparative Examples, but the present invention is not specifically limited to the following Examples.

[Materials Used]

The common materials used in the following Examples and Comparative Example are as follows.

<Substrate Layer (SB)>

SB: A 25 μm coextruded multilayer stretched film (manufactured by Gunze Limited) of polyethylene terephthalate film (PET) and nylon film (Ny).

<Adhesive Layer (AD)>

AD: A polyurethane-based adhesive incorporating a tolylene diisocyanate adduct-based curing agent in a 4 μm polyester polyol-based base resin (manufactured by Toyo Ink Co., Ltd.).

<Corrosion Prevention Treatment Layer (CL)>

The treatment of the inner layer side described below is applied.

<Aluminum Foil Layer (AL)>

AL: Annealed and degreased soft aluminum foil having a thickness of 40 μm ("8079" manufactured by Toyo Aluminum K.K.)

<Corrosion Prevention Treatment Layer (CL)>

(CL-1): A "sodium polyphosphate-stabilized cerium oxide sol" adjusted to a solid concentration of 10 wt % using distilled water for the solvent. Note that, 10 parts by mass of phosphate was formulated per 100 parts by mass of cerium oxide.

(CL-2): A composition made up of 90 wt % of "polyacrylic acid ammonium salt (Toagosei Co., Ltd.)" and 10 wt % of "acrylic-isopropylenyl oxazoline copolymer (Nippon Shokubai Co., Ltd.)" adjusted to a solid concentration of 5 wt % using distilled water for the solvent.

(CL-3): A chemical conversion coating agent prepared by adding chromium fluoride ($CrF_3$) to a water-soluble phenol resin (Sumitomo Bakelite Co., Ltd.), adjusted to a solid concentration of 1 wt % using an aqueous phosphoric acid solution having a concentration of 1 mass % as solvent, and adjusting the concentration to 10 mg/m² as the amount of Cr present in the final dry coating.

(CL-4): A composition made up of 90 wt % of "polyallylamine (Nitto Boseki Co., Ltd.)" and 10 wt % of "polyglycerol polyglycidyl ether (Nagase Chemtex Corp.)" adjusted to a solid concentration of 5 wt % using distilled water for the solvent.

<Adhesive Resin Layer (AR)>

AR-[(a)+(b)]: An acid-modified polypropylene resin composition (manufactured by Mitsui Chemicals Inc.) of a random polypropylene (PP) base formulated with an ethylene-propylene rubber as an incompatible rubber.

AR-(A): A polypropylene or a propylene-α-olefin copolymer having an atactic structure ("Tafthren H" manufactured by Sumitomo Chemical Co., Ltd.).

AR-(B): A propylene-α-olefin copolymer having an isotactic structure ("Tafiner-XM" manufactured by Mitsui Chemicals Inc.).

<Sealant Layer (SL)>

SL: A 60 μm unstretched polypropylene resin (manufactured by Futamura Chemical Co., Ltd).

[Production Method and Evaluation Method for the Lithium Battery Packaging Material]

<Preparation of the Packaging Material>

First, the first corrosion prevention treatment layer was provided on the aluminum foil layer (AL) by microgravure coating. The coating amount was set to 50 to 100 mg/m² as the dry coated amount of the coating agent, and was subjected to a baking treatment in the drying unit at 150 to 250° C. according to the type of coating agent. The composition using (CL-1) and (CL-2) was made to express the corrosion prevention performance by compounding these agents. By first coating and baking (CL-1) on the aluminum foil layer (AL) and then coating (CL-2) thereon, a compound layer composed of (CL-1) and (CL-2) was formed. (CL-3) itself was used as the first corrosion prevention treatment layer.

Next, the aluminum foil layer (AL) which was provided with the first corrosion prevention treatment layer was bonded to the substrate layer (SB) using the polyurethane-based adhesive (AD) by dry laminating. The substrate layer (SB) bonded with the aluminum foil layer (AL) was set in the unwinding unit of an extrusion laminator equipped with an anchor coating unit. The sealant layer (SL) was set in the sandwiched base material portion, and the second corrosion prevention treatment layer was set in the anchor coating unit. Furthermore, the laminate was produced by extruding the adhesive resin layer (AR) from an extruder at 290° C. and sandwich-laminating at a processing speed of 80 m/minute. Regarding the adhesive resin layer (AR), the compounds of the various materials were prepared in advance using a twin-screw extruder, and were used in the aforementioned extrusion laminate after having been prepared by going through water cooling and pelletization steps. The laminate thus obtained was subjected to a heat treatment by thermal lamination so that the maximum attainable temperature of the laminate was 160, 170, 180, 190 or 200° C., thereby producing the packaging materials for lithium batteries of Examples 1 to 11 and Comparative Example 1. The evaluations described below were performed.

The packaging materials for lithium batteries of Examples 1 to 6 and Comparative Example 1 were obtained by changing the respective components of the adhesive resin layer (AR) (refer to the following Table 1). Further, in the packaging materials for lithium batteries of Examples 1 to 6 and Comparative Example 1, the corrosion prevention treatment was performed by combining "CL1+CL2+CL4".

On the one hand, the packaging materials for lithium batteries of Examples 7 to 11 were obtained by respectively changing the combination of the corrosion prevention treatments (refer to the following Table 2). Further, in the packaging materials for lithium batteries of Examples 7 to 11, the components of the adhesive resin layer (AR) were set to a composition ratio of "(a)+(b)=60, (A)=20, (B)=20".

<Evaluation>

(Electrolytic Solution Lamination Strength)

An electrolytic solution prepared by adding 1M (1 mol/L) of $LiPF_6$ to a solution of ethylene carbonate/diethyl carbonate/dimethyl carbonate=1/1/1 was filled in a Teflon (a registered trademark) container, a sample cut to 15 mm×100 mm was placed in the container, the container was sealed, and then stored at 85° C. for 24 hours. Then, after washing together, the strength of lamination (T-peel strength) between the AL/adhesive resin was measured using a testing machine (manufactured by INSTRON, Inc.). The testing was conducted in accordance with JISK 6854, by cutting the sample to 150 mm×width 15 mm, under an atmosphere of 23° C.×50% RH, and at a peeling rate of 50 mm/min.

The results of the lithium battery packaging material of Examples 1 to 6 and Comparative Example 1 are shown in the following Table 1. Further, the results of the lithium battery packaging material of Examples 7 to 11 are shown in the following Table 2. Note that, the contents of the evaluations shown in Tables 1 and 2 are as follows. (Please note that the evaluations like "Very Good" and "Good," etc., are for the purpose only for comparative analysis to the other results.)

Very good: The strength of lamination was in excess of 12 N/15 mm

Good: The strength of lamination was 10 N/15 mm to 12 N/15 mm, inclusive

Fair: The strength of lamination was 6 or more to less than 10 N/15 mm

Poor: The strength of lamination was less than 6 N/15 mm (Electrolytic Solution Heat Sealing Strength)

Figure 3:
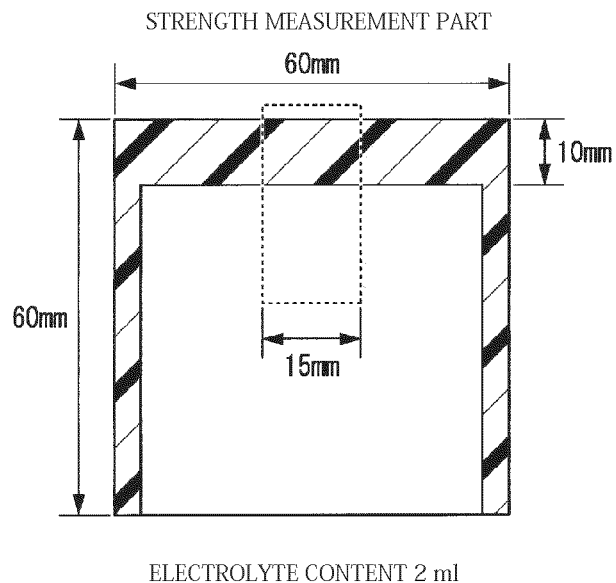
FIG. 3 is a schematic view illustrating a method of preparing an evaluation sample in an example.

A sample cut to 60 mm×120 mm was folded in two, and one side was heat sealed with a 10 mm width seal bar at 190° C., 0.5 MPa for 3 sec. Then, the two remaining sides were heat sealed and an electrolytic solution adjusted with 1 M of $LiPF_6$ in a mixed solution of ethylene carbonate/diethyl carbonate/dimethyl carbonate=1/1/1 (weight ratio) was poured in the bag-shaped packaging material, and the pouch was formed. The pouch, after being stored at 60° C. for 24 hours, was cut to a 15 mm width on the heat sealed side (refer to FIG. 3), and the sealing strength (T-peel strength) was measured using a testing machine (manufactured by INSTRON Inc.). The testing was conducted in accordance with JISK 6854, by cutting the sample to 150 mm×width 15 mm, under an atmosphere of 23° C.×50% RH, and at a peeling rate of 50 mm/min.

The results of the packaging materials for lithium batteries of Examples 1 to 6 and Comparative Example 1 are shown in the following Table 1. Further, the results of the packaging materials for lithium batteries of Examples 7 to 11 are shown in the following Table 2. The contents of the evaluations shown in Tables 1 and 2 are as follows.

Very good: The sealing strength was 100 N/15 mm or more, and the burst width was in excess of 10 mm Good: The sealing strength was 100 N/15 mm or more, and the burst width was 5 to 10 mm Fair: The sealing strength was 80 N/15 mm or more to less than 100 N/15 mm Poor: The sealing strength was less than 80 N/15 mm (Degassing Heat Sealing Strength)

Figure 4A:
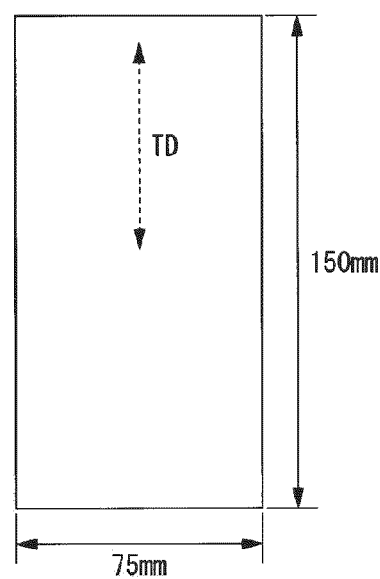
FIG. 4A is a schematic view illustrating a method of preparing an evaluation sample in an example.
Figure 4B:
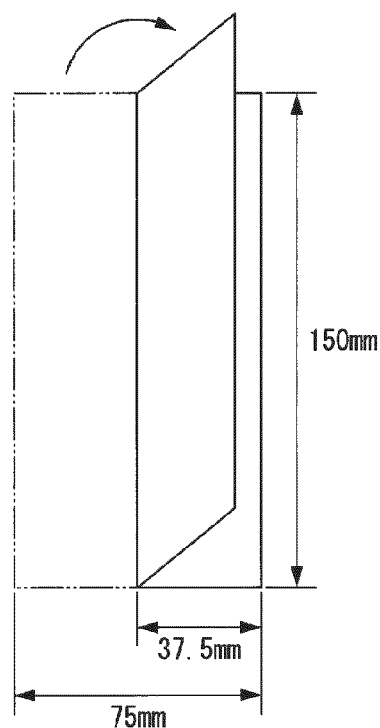
FIG. 4B is a schematic view illustrating a method of preparing an evaluation sample in an example.
Figure 4C:
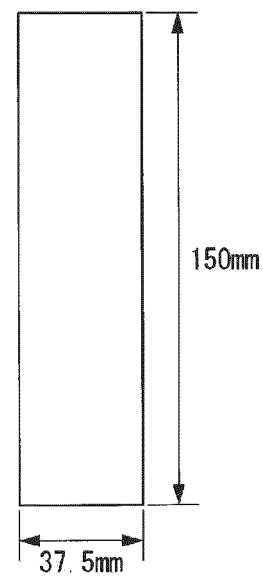
FIG. 4C is a schematic view illustrating a method of preparing an evaluation sample in an example.
Figure 4D:
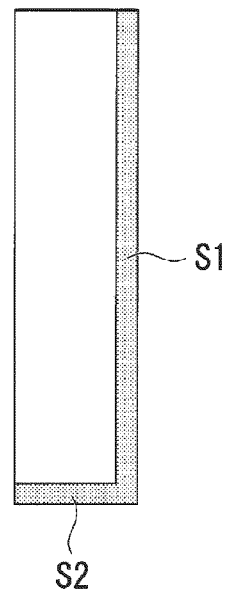
FIG. 4D is a schematic view illustrating a method of preparing an evaluation sample in an example.
Figure 4E:
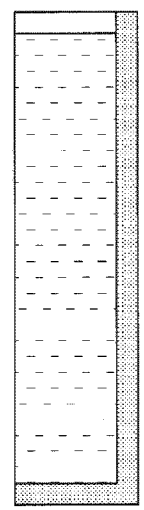
FIG. 4E is a schematic view illustrating a method of preparing an evaluation sample in an example.
Figure 4F:
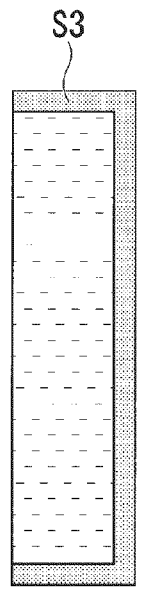
FIG. 4F is a schematic view illustrating a method of preparing an evaluation sample in an example.
Figure 4G:
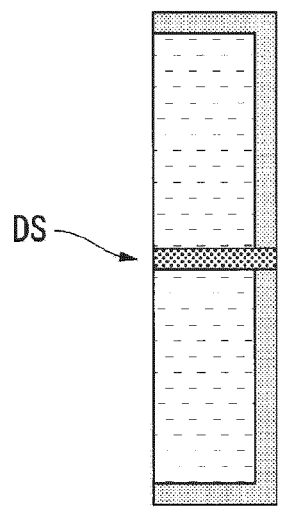
FIG. 4G is a schematic view illustrating a method of preparing an evaluation sample in an example.
Figure 4H:
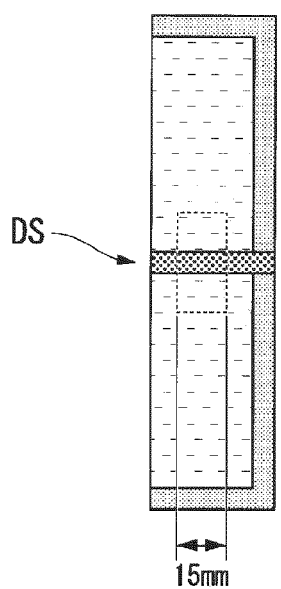
FIG. 4H is a schematic view illustrating a method of preparing an evaluation sample in an example.

The fabrication method of the sample which is the object for evaluation of the degassing heat sealing strength will be described. First, a sample cut to 75 mm×150 mm was prepared (refer to FIG. 4A). Two folded 37.5 mm×150 mm samples were obtained (refer to FIGS. 4B and 4C) by folding the sample at the center (the center line parallel to reference sign TD) of the sample. Then, the 150 mm side (reference sign S1) was heat sealed with one of the two 37.5 mm sides (reference sign S2) and the bag was formed (FIG. 4D). Then, 5 ml of the electrolytic solution adjusted with 1 M of $LiPF_6$ in a mixed solution of ethylene carbonate/diethyl carbonate/dimethyl carbonate=1/1/1 (weight ratio) was poured in the pouch through the opening (FIG. 4E). The other of the two 37.5 mm sides (reference sign S3, sides forming the opening) was heat sealed, and the pouch was sealed (FIG. 4F). Then, after storing the sample at 60° C. for 24 hours, the center part of the pouch was heat sealed at 190° C., 0.3 MPa, for 2 sec in a state which included the electrolytic solution (refer to the degassing seal part DS, FIG. 4G). Namely, in the degassing seal part DS, the two inner surfaces which formed the sample were heat sealed so that the electrolytic solution in the pouch was sandwiched. After the sealed part was stabilized and stored at room temperature for 24 hours, the degassing seal part DS was cut to a width of 15 mm (refer to FIG. 4H). The heat sealing strength (T-peel strength) of the cut degassing seal part DS was measured using a testing machine (manufactured by INSTRON Inc.). The testing was conducted in accordance with JISK 6854, by cutting the sample to 150 mm× width 15 mm, under an atmosphere of 23° C. 50% RH, and at a peeling rate of 50 mm/min.

The results of the lithium battery packaging material of Examples 1 to 6 and Comparative Example 1 are shown in the following Table 1. Further, the results of the lithium battery packaging material of Examples 7 to 11 are shown in the following Table 2. The contents of the evaluations shown in Tables 1 and 2 are as follows.

Very good: The sealing strength was 80 N/15 mm or more

Good: Sealing strength was 60 N/15 mm or more to less than 80 N/15 mm

Fair: The sealing strength was 40 N/15 mm or more to less than 60 N/15 mm

Poor: The sealing strength was less than 40 N/15 mm (Bending Insulation)

Figure 5A:
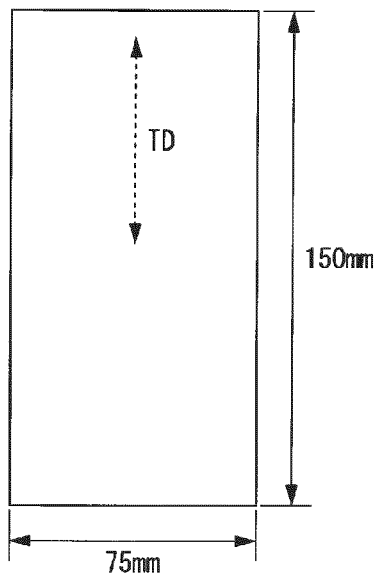
FIG. 5A is a schematic view illustrating a method of preparing an evaluation sample in an example.
Figure 5B:
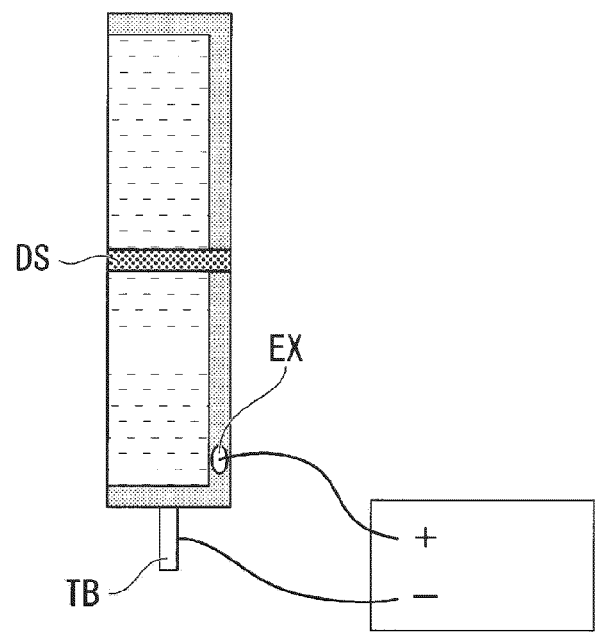
FIG. 5B is a schematic view illustrating a method of preparing an evaluation sample in an example.

The fabrication method of the sample which is the object for evaluation of the bending insulation property will be described. In following description, any one of the aforementioned FIGS. 4A to 4H may be referred to. First, as shown in FIG. 5A, samples cut to 75 mm×150 mm were prepared. Two folded 37.5 mm×150 mm samples were obtained (in the same manner as FIGS. 4B and 4C) by folding the sample at the center (the center line parallel to reference sign TD) of the sample. Then, the 150 mm side (corresponding to reference sign S1 of FIG. 4D) was heat sealed. Then, an Ni tab TB was sandwiched through a tab sealant on one (corresponding to reference sign S2 of FIG. 4D) of the two folded 37.5 mm sides, this side was heat sealed, and the tab TB was fixed (refer to FIG. 5B). Then, a part of the outermost side of the sample was ground and the metal foil layer was exposed (FIG. 5B, reference sign EX). Then, 5 ml of the electrolytic solution adjusted with 1 M of $LiPF_6$ in a mixed solution of ethylene carbonate/diethyl carbonate/dimethyl carbonate=1/1/1 (weight ratio) was poured in the pouch through the opening (in the same manner as FIG. 4E). The 37.5 mm side which formed the opening (corresponding to reference sign S3 of FIG. 4D) was sealed by heat sealing. Then, the sample was stored in a 60° C. environment for 24 hours to make the inner layer swell. Then, the center part of the pouch was heat sealed (the degassing seal part DS, FIG. 5B) in a state which included the electrolytic solution, and the electrolytic solution was heat fused in a state sandwiched between the sealant layer. Then, the tab TB was joined with the negative terminal, and the exposed metallic layer EX was joined with the positive terminal (refer to FIG. 5B). Then, a Withstand Voltage/Insulation Resistance Tester ("TOS9201" manufactured by KIKUSUI ELECTRONIC CORP.) was used to apply a voltage of 25V across the terminals, and it was verified that the resistance at this time was in excess of 200 MΩ. Then, the sealing part sandwiching the tab was fixed and the degassing seal part DS was bent at a speed of 90° 30 rpm. After bending 30 times, the tab TB was joined with the negative terminal, and the exposed metallic layer EX was joined with the positive terminal. Then, the Withstand Voltage/Insulation Resistance Tester ("TOS9201" manufactured by KIKUSUI ELECTRONIC CORP.) was used to apply a voltage of 25V across the terminals. When the resistance at this time was in excess of 200 MΩ, it was judged that the insulation was good. The number of test samples in each of the Examples and the Comparative Examples was 30. The results of the packaging materials for lithium batteries of Examples 1 to 6 and Comparative Example 1 are shown in the following Table 1. Further, the results of the packaging materials for lithium batteries of Examples 7 to 11 are shown in the following Table 2. Note that, the contents of the evaluations shown in Tables 1 and 2 are as follows.

(Blushing During Forming)

The samples stored under normal conditions or at 60° C. for 1 week were cut to 120 mm×200 mm, and set at a die for cold forming so that the sealant layer (CPP) was in contact with a projection of the forming machine, and deep drawing to 5 mm was performed at a forming speed of 10 mm/sec. Then, blushing was observed on the side positioned on the film-pressing portion side on which the stretching was the most severe.

Die: the forming area was 80 mm×70 mm (rectangular cylindrical shape)

Corner-R: Punch (RCP) 1.0 mm

The results of the packaging materials for lithium batteries of Examples 1 to 6 and Comparative Example 1 are shown in the following Table 1. Further, the results of the packaging materials for lithium batteries of Examples 7 to 11 are shown in the following Table 2. The contents of the evaluations shown in Tables 1 and 2 are as follows.

Very good: There was no blushing under normal conditions and after 1 week at 80° C.

Good: There was no blushing under normal conditions and there was thin blushing after 1 week at 80° C.

Fair: There was slight blushing under normal conditions, and blushing after 1 week at 80° C.

Poor: There was blushing under normal conditions.

(Overall Evaluation)

The aforementioned evaluation results of Example 1-11 and Comparative Example 1 were combined in the following Tables 1 and 2, and were overall evaluations were made by the following criteria.

Each evaluation in Tables 1 and 2 that was judged to be "Very good" and "Good" was deemed to be acceptable, and those judged "Fair" and "Poor" were inferior in performance. Further, the overall evaluation was judged to be acceptable "Good" when there were no "Fair" and "Poor" results, and was judged to be unacceptable "Poor" when there was a "Poor" result.

TABLE 1

| | (a) + (b) | (A) | (B) | Electrolytic solution lamination strength | | Electrolytic solution heat sealing strength | | Degassing heat sealing strength | | Bending insulation | Formation blushing | Overall evaluation |
|---|---|---|---|---|---|---|---|---|---|---|---|---|
| Ex. 1 | 95 | 5 | 0 | 12N | Very good | 120N 10 mm | Good | 60N | Good | Good | Good | Good |
| Ex. 2 | 95 | 2.5 | 2.5 | 10N | Good | 120N 12 mm | Very good | 70N | Good | Very good | Very good | Very good |
| Ex. 3 | 60 | 40 | 0 | 14N | Very good | 120N 10 mm | Good | 70N | Good | Good | Good | Good |
| Ex. 4 | 60 | 20 | 20 | 12N | Very good | 120N 15 mm | Very good | 90N | Very good | Very good | Very good | Very good |
| Ex. 5 | 40 | 60 | 0 | 14N | Very good | 120N 8 mm | Good | 70N | Good | Very good | Good | Good |
| Ex. 6 | 40 | 30 | 30 | 12N | Very good | 120N 15 mm | Very good | 90N | Very good | Very good | Very good | Very good |
| Comp. Ex. 1 | 100 | 0 | 0 | 7N | Fair | 120N 5 mm | Good | 40N | Poor | Poor | Poor | Poor |

TABLE 2

| | Corrosion prevention treatment | Electrolytic solution lamination strength | | Electrolytic solution heat sealing strength | | Degassing heat sealing strength | | Bending insulation | Formation blushing | Overall evaluation |
|---|---|---|---|---|---|---|---|---|---|---|
| Ex 7 | CL-1 + CL-2 + CL-4 | 12N | Very good | 120N 15 mm | Very good | 90N | Very good | Very good | Very good | Good |
| Ex. 8 | CL-1 + CL-2 | 10N | Good | 120N 15 mm | Very good | 90N | Very good | Very good | Very good | Good |
| Ex. 9 | CL-1 + CL-4 | 12N | Very good | 120N 15 mm | Very good | 90N | Very good | Very good | Very good | Good |
| Ex. 10 | CL-3 + CL-4 | 12N | Very good | 120N 15 mm | Very good | 90N | Very good | Very good | Very good | Good |
| Ex .11 | CL-3 | 10N | Good | 120N 15 mm | Very good | 90N | Very good | Very good | Very good | Good |

As shown in Table 1, in Comparative Example 1, the adhesive resin layer (AR) does not contain the additive component (A), thus, the electrolytic solution lamination strength deteriorates, the burst width of the electrolytic solution heat sealing was small, and the properties with the evaluation of the degassing heat sealing strength and the blushing during molding were not acceptable.

With respect thereto, in Examples 1 to 6, the adhesive resin layer (AR) contains the additive components (A), thus, the electrolytic solution lamination strength was good. Example 2 in which the content of the additive component (A) was 2.5 wt % was inferior in electrolytic solution lamination strength compared to Examples 1, and 2 to 6, but had an electrolytic solution lamination strength to the extent that there were no practical problems. Furthermore, Examples 2, 4 and 6 which added the additive component (B) in addition to the additive components (A) had good results for the evaluation such as the electrolytic solution heat sealing strength, degassing heat sealing strength, bending insulation and the blushing during forming.

Examples 7 to 11 shown in Table 2 are examples which changed the structure of the corrosion prevention treatment layer (CL) in Example 4 shown in Table 1. As shown in FIG. 2, the packaging materials obtained in Examples 7 to 11 were very good in electrolytic solution resistance, and the blushing phenomenon could be prevented.

Further, Examples 8 and 11 show examples which did not provide the second corrosion prevention treatment layer (CL-4) in Example 4. As a result, it was verified that providing the second corrosion prevention treatment layer (CL-4) (i.e., allowing the specific cationic polymer to be contained in the corrosion prevention treatment layer (CL)) contributed greatly to the improvement of the adhesion between the adhesive resin layer (AR) and the corrosion prevention treatment layer (CL) due to the heat treatment of the laminate.

The packaging materials obtained in Examples 8 and 11 were not provided with the second corrosion prevention treatment layer (CL-4), thus, the adhesion between the adhesive resin layer (AR) and the corrosion prevention treatment layer (CL) deteriorated compared to Examples 7, 9 and 10, and as a result, the electrolytic solution resistance slightly deteriorated, but an electrolytic solution resistance to the extent that there were no practical problems could be obtained.

INDUSTRIAL APPLICABILITY

The lithium battery packaging material of the present invention can provide improved stability in the electrolytic solution lamination strength, the heat sealing strength, and the degassing heat sealing strength, and resistance to blushing during forming and resistance to bending insulation, and thus has the industrial applicability that can impart improved safety and stability to the lithium batteries.

REFERENCE SIGNS LIST

10 . . . lithium battery packaging material (packaging material)
11 . . . substrate layer
12 . . . adhesive layer
13 . . . aluminum foil layer
14 . . . corrosion prevention treatment layer
14-1 . . . first corrosion prevention treatment layer
14-2 . . . second corrosion prevention treatment layer
15 . . . adhesive resin layer
15a . . . modified polyolefin resin (a)
15b . . . macrophase-separated thermoplastic elastomer (b)
15c . . . voids and craze
16 . . . sealant layer

What is claimed is:

1. A lithium battery packaging material comprising:
a laminate configured by laminating an adhesive layer,
an aluminum foil layer provided with a corrosion prevention treatment layer on at least one surface thereof, an adhesive resin layer,
and a sealant layer in this order on one surface of a substrate layer,
wherein the adhesive resin layer contains an adhesive resin composition; (A) a polypropylene having an atactic structure or a propylene-α-olefin copolymer having an atactic structure and (B) a propylene-α-olefin copolymer having an isotactic structure,
a weight content of the adhesive resin composition in the adhesive resin layer is 40 to 95 wt %,
a weight content of a total (A)+(B) of (A) the polypropylene having the atactic structure or propylene-α-olefin copolymer having the atactic structure and (B) the propylene-α-olefin copolymer having the isotactic structure in the adhesive resin layer is 5 to 60 wt %,
a weight content of (A) the polypropylene having the atactic structure or propylene-α-olefin copolymer having the atactic structure in the adhesive resin layer is from 5 to 60 wt %, and,
a weight content of (B) the propylene-α-olefin copolymer having the isotactic structure in the adhesive resin layer is 5 to 60 wt %.

2. The lithium battery packaging material of claim 1, wherein
the corrosion prevention treatment layer is provided on a surface of the aluminum foil layer, the surface of the aluminum foil layer being in contact with the adhesive resin layer; and
the corrosion prevention treatment layer contains a cationic polymer and a cross-linking agent for cross-linking the cationic polymer.

3. The lithium battery packaging material of claim 2, wherein the cationic polymer is at least one member selected from the group consisting of a polyethyleneimine, an ionic polymer complex made of a polyethyleneimine and a polymer having carboxylic acid, a primary amine-grafted acrylic resin obtained by grafting a primary amine onto a main acrylic backbone, a polyallylamine and a derivative thereof, and an aminophenol.

4. The lithium battery packaging material of claim 1, wherein the corrosion prevention treatment layer is a layer containing a rare earth element oxide.

5. The lithium battery packaging material of claim 1, wherein the corrosion prevention treatment layer includes a layer formed by subjecting the aluminum foil layer to one or more of a degreasing treatment, a hydrothermal modification treatment, an anodic oxidation treatment, and a chemical conversion treatment.

6. The lithium battery packaging material of claim 1, wherein the weight content of (A) the polypropylene having the atactic structure or propylene-α-olefin copolymer having the atactic structure in the adhesive resin layer is from 5 to 30 wt % and wherein the weight content of (B) the propylene-α-olefin copolymer having the isotactic structure in the adhesive resin layer is 5 to 30 wt %.

7. The lithium battery packaging material of claim 1, wherein the weight content of (A) the polypropylene having the atactic structure or propylene-α-olefin copolymer having the atactic structure in the adhesive resin layer is from 20 to 30 wt % and wherein the weight content of (B) the propylene-α-olefin copolymer having the isotactic structure in the adhesive resin layer is 20 to 30 wt %.

* * * * *